US012675058B2

(12) United States Patent
Saito et al.

(10) Patent No.: US 12,675,058 B2
(45) Date of Patent: Jul. 7, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Erina Saito, Kanagawa (JP); Tomohito Nakajima, Kanagawa (JP); Daisuke Ishizuka, Kanagawa (JP); Tsutomu Furuta, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 580 days.

(21) Appl. No.: 18/316,246

(22) Filed: May 12, 2023

(65) Prior Publication Data

US 2024/0201610 A1 Jun. 20, 2024

(30) Foreign Application Priority Data

Dec. 1, 2022 (JP) ................................ 2022-192968

(51) Int. Cl.
*G03G 9/087* (2006.01)
*G03G 9/08* (2006.01)

(52) U.S. Cl.
CPC ....... *G03G 9/08797* (2013.01); *G03G 9/0819* (2013.01); *G03G 9/0821* (2013.01); *G03G 9/08755* (2013.01); *G03G 9/08795* (2013.01)

(58) Field of Classification Search
CPC ............... G03G 9/0821; G03G 9/0825; G03G 9/08711; G03G 9/08755
See application file for complete search history.

(56) References Cited

U.S. PATENT DOCUMENTS 11,131,940 B2 9/2021 Sakamoto et al.
2005/0208414 A1* 9/2005 Nakamura .......... G03G 9/0827 430/110.2

(Continued)

FOREIGN PATENT DOCUMENTS

JP 2015052714 3/2015
JP 2015148668 8/2015

(Continued)

*Primary Examiner* — Peter L Vajda
(74) *Attorney, Agent, or Firm* — JCIPRNET

(57) ABSTRACT

An electrostatic charge image developing toner contains toner particles that contain a binder resin containing an amorphous resin and a crystalline resin and resin particles, in which the electrostatic charge image developing toner satisfies the following Condition (1) and Condition (2). Condition (1): in a case where dynamic viscoelasticity of the toner particles is measured, a temperature T0 at which a complex viscosity $\eta^*$ of the toner particles is $1.0\times10^7$ Pa·s is 50° C. or lower, Condition (2): in a case where dynamic viscoelasticity of the resin particles is measured, a complex viscosity $\eta^*$ of the resin particles at the temperature T0 is $1.0\times10^4$ Pa·s or more, and $\Delta A$ calculated by the following Equation (1) is 0.2 or more. Equation (1): $\Delta A=|\text{Log }\eta^*(T0+5)-\text{Log }\eta^*(T0-5)|$, in Equation (1), $\eta^*(T0+5)$ is a complex viscosity (unit: Pa·s) at a temperature 5° C. higher than the temperature T0, and $\eta^*(T0-5)$ is a complex viscosity (unit: Pa·s) at a temperature 5° C. lower than the temperature T0.

19 Claims, 2 Drawing Sheets

(56) References Cited

U.S. PATENT DOCUMENTS

| | | | | |
|---|---|---|---|---|
| 2015/0044602 | A1* | 2/2015 | Kitagawa ........... | G03G 9/08793<br>430/105 |
| 2021/0253845 | A1 | 8/2021 | Nakamura et al. | |

FOREIGN PATENT DOCUMENTS

| | | |
|---|---|---|
| JP | 2020046499 | 3/2020 |
| JP | 2020160202 | 10/2020 |
| JP | 2021127431 | 9/2021 |

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-192968 filed Dec. 1, 2022.

BACKGROUND

(i) Technical Field

The present disclosure relates to an electrostatic charge image developing toner, an electrostatic charge image developer, a toner cartridge, a process cartridge, an image forming apparatus, and an image forming method.

(ii) Related Art

JP2020-160202A discloses an electrostatic charge image developing toner that contains at least a binder resin, has a storage modulus G' which is determined by dynamic viscoelasticity measurement and is $2\times10^6$ Pa or more and $3\times10^8$ Pa or less at 50° C. and $1\times10^4$ Pa or more and $1\times10^6$ Pa or less at 100° C., and has tan δ of 0.05 or more and 1.5 or less in the entire temperature range of 50° C. or higher and 100° C. or lower.

JP2015-148668A discloses a toner that contains at least a polyester resin and a release agent, in which the release agent contains a linear monoester having 48 or more carbon atoms, a glass transition temperature of the toner in the first heating of differential scanning calorimetry is 20° C. or higher and 50° C. or lower, the toner contains a THF-insoluble fraction, a glass transition temperature of the THF-insoluble fraction in the second heating of differential scanning calorimetry is −40° C. or higher and 30° C. or lower, and the THF-insoluble fraction of the toner satisfies $G'(100)=1\times10^5$ to $1\times 10^7$ Pa and $$G'(40)/G'(100) \leq 3.5\times10$$

where G'(40) and G'(100) represent storage moduli of the THF-insoluble fraction of the toner at 40° C. and 100° C. respectively.

JP2015-052714A discloses an electrostatic charge image developing toner containing a binder resin that includes an amorphous resin and resin particles that have an elastic modulus of $10^4$ Pa or more and $10^6$ Pa or less at 30° C. and an elastic modulus of $10^4$ Pa or more and $10^6$ Pa or less at 100° C.

JP2020-046499A discloses an electrostatic charge image developing toner that contains a binder resin and rubber particles, in which the rubber particles have a compressive permanent strain of 20% or more and 50% or less at a temperature at which a melt viscosity of the toner reaches $10^4$ Pa.

SUMMARY

Aspects of non-limiting embodiments of the present disclosure relate to an electrostatic charge image developing toner that forms an image in which transfer failure of a foil is unlikely to occur in a case where foil stamping is performed on the image of a recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above object include the following aspect.

According to an aspect of the present disclosure, there is provided an electrostatic charge image developing toner containing toner particles that contain a binder resin containing an amorphous resin and a crystalline resin and resin particles, in which the electrostatic charge image developing toner satisfies the following Condition (1) and Condition (2), Condition (1): in a case where dynamic viscoelasticity of the toner particles is measured, a temperature T0 at which a complex viscosity η* of the toner particles is $1.0\times10^7$ Pa·s is 50° C. or lower.

Condition (2): in a case where dynamic viscoelasticity of the resin particles is measured, a complex viscosity η* of the resin particles at the temperature T0 is $1.0\times10^4$ Pa·s or more, and ΔA calculated by the following Equation (1) is 0.2 or more.

$$\Delta A=|\mathrm{Log}\ \eta^*(T0+5)-\mathrm{Log}\ \eta^*(T0-5)| \quad \text{Equation (1)}$$

In Equation (1), η*(T0+5) is a complex viscosity (unit: Pa·s) at a temperature 5° C. higher than the temperature T0, and η*(T0−5) is a complex viscosity (unit: Pa·s) at a temperature 5° C. lower than the temperature T0.

BRIEF DESCRIPTION OF THE DRAWINGS

Exemplary embodiment(s) of the present invention will be described in detail based on the following figures, wherein.

DETAILED DESCRIPTION

Figure 1:
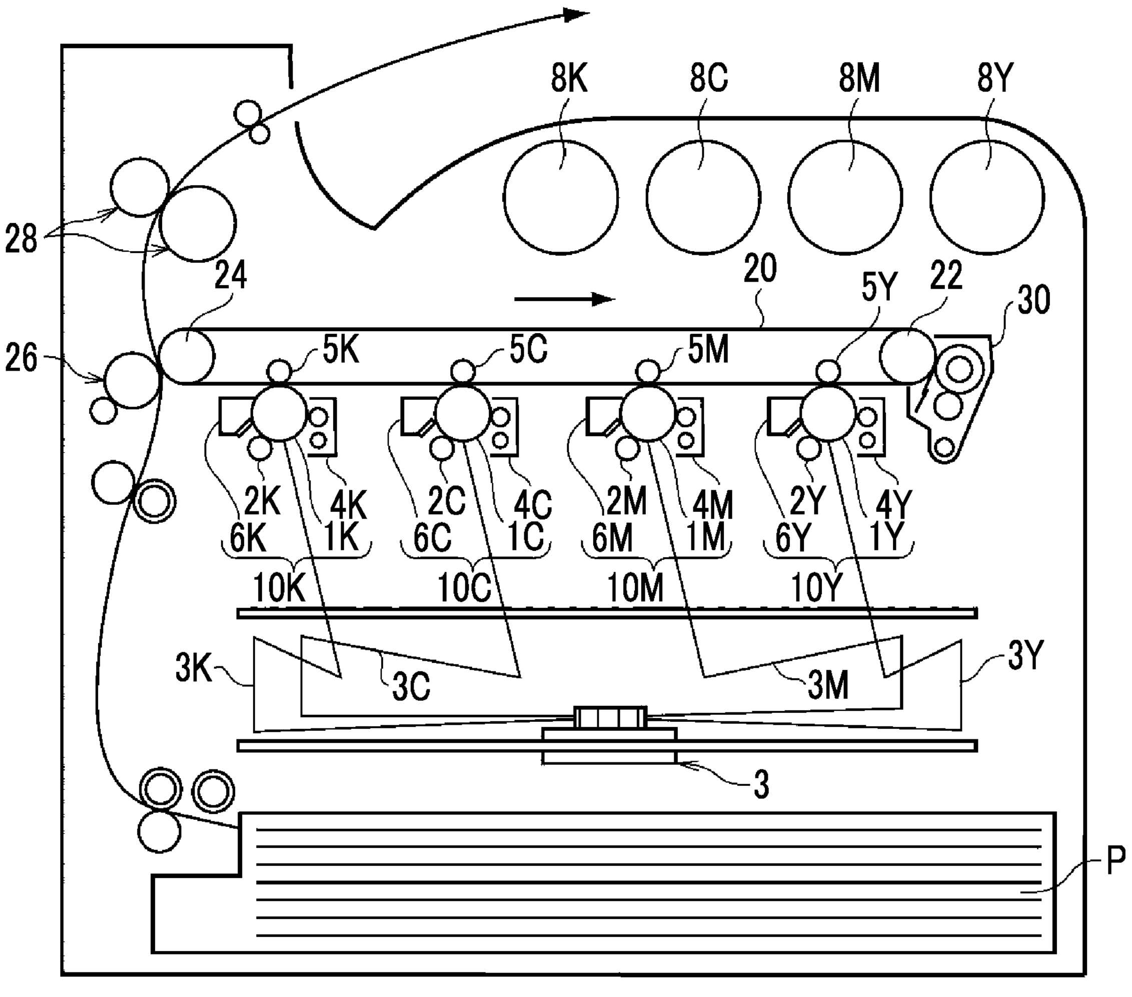
FIG. 1 is a view schematically showing the configuration of an example of an image forming apparatus according to the present exemplary embodiment.

The exemplary embodiments of the present disclosure will be described below. The following descriptions and examples merely illustrate the exemplary embodiments, and do not limit the scope of the exemplary embodiments.

In the present disclosure, a range of numerical values described using "to" represents a range including the numerical values listed before and after "to" as the minimum value and the maximum value respectively.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, the term "step" includes not only an independent step but a step which is not clearly distinguished from other steps as long as the goal of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more substances corresponding to each component in the composition, unless otherwise specified, the amount of each component means the total amount of two or more such substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, "(meth)acryl" is an expression including both the acryl and methacryl, and "(meth)acrylate" is an expression including both the acrylate and methacrylate.

In the present disclosure, "electrostatic charge image developing toner" is also called "toner", "electrostatic charge image developer" is also called "developer", and "electrostatic charge image developing carrier" is also called "carrier".

Electrostatic Charge Image Developing Toner

The toner according to the present exemplary embodiment contains toner particles that contain a binder resin including an amorphous resin and a crystalline resin and resin particles, and satisfies the following Condition (1) and Condition (2).

Condition (1): in a case where dynamic viscoelasticity of the toner particles is measured, a temperature T0 at which a complex viscosity $\eta^*$ of the toner particles is $1.0\times10^7$ Pa·s is 50° C. or lower.

Condition (2): in a case where dynamic viscoelasticity of the resin particles is measured, a complex viscosity $\eta^*$ of the resin particles at the temperature T0 is $1.0\times10^4$ Pa·s or more, and ΔA calculated by the following Equation (1) is 0.2 or more.

$$\Delta A=|\mathrm{Log}\ \eta^*(T0+5)-\mathrm{Log}\ \eta^*(T0-5)| \quad \text{Equation (1)}$$

In Equation (1), $\eta^*(T0+5)$ is a complex viscosity (unit: Pa·s) at a temperature 5° C. higher than the temperature T0, and $\eta^*(T0-5)$ is a complex viscosity (unit: Pa·s) at a temperature 5° C. lower than the temperature T0. "Log" means a common logarithm.

The complex viscosity $\eta^*$ of the toner particles according to Condition (1) is an index of toner viscosity. Satisfying Condition (1) means that at least a part of the binder resin of the toner particles begins to soften at a temperature of 50° C. or lower.

The complex viscosity $\eta^*$ of the resin particles according to Condition (2) is an index of viscosity of the resin particles, and ΔA is an index of an extent of deformation. Satisfying Condition (2) means that the resin particles soften at around the temperature at which the viscosity of the toner particles begins to decrease.

In the related art, there is a technique of performing foil stamping on a part or all of an image formed on a recording medium by a toner. In this technique, an image of a portion to be subjected to foil stamping functions as an adhesive for attaching the foil to the recording medium. The image of a portion to be subjected to foil stamping may be formed of a transparent toner or a colored toner. In a case where the image of a portion to be subjected to foil stamping is formed of a colored toner, the toner functions as a marker of the portion to be subjected to foil stamping on the recording medium.

The toner according to the present exemplary embodiment may be a transparent toner or a colored toner.

The toner according to the present exemplary embodiment may be used to form only an image to be subjected to foil stamping, or may be used to form an image to be subjected to foil stamping and an image not to be subjected to foil stamping. For example, one or a plurality of images is formed on one recording medium by using the toner according to the present exemplary embodiment, and foil stamping is performed on a part or all of the one or a plurality of images.

In an image formed on a recording medium by the toner according to the present exemplary embodiment, transfer failure of a foil is unlikely to occur when foil stamping is performed on the image. The reason is presumed as follows.

In a technique of superimposing an art material, from which a foil is to be transferred, on a toner image and performing foil stamping on a recording medium by an iron-on printing method (that is, a transfer method of applying heat and pressure), the toner image functions as an adhesive for attaching the foil to the recording medium. That is, the toner image and the foil are attached to each other by heat and pressure, and the foil is fixed onto the image by pressure-sensitive adhesive force of the toner image.

In a case where the foil stamping is performed, sometimes the toner image permeates into the recording medium, resulting in transfer failure of the foil. This phenomenon is likely to occur in an image formed of a toner that contains a crystalline resin and is fixed at a relatively low temperature. It is considered that the application of heat may allow the crystalline resin to rapidly melt, reduce the viscosity of the toner image, and the toner image may thus permeate into the recording medium, which may make it difficult to attach the foil to the toner image.

In the related art, it is known that a toner image formed of a toner containing resin particles as an internal additive does not easily permeate into a recording medium. However, such a toner is not enough for suppressing the transfer failure in foil stamping of the iron-on printing method. Because the resin particles contained in the toner as an internal additive are scattered in the toner image, it is not possible to suppress the permeation of the entire toner image into the recording medium.

On the other hand, because the toner according to the present exemplary embodiment satisfies Condition (1), at least a part of the binder resin of the toner begins to soften at a temperature of 50° C. or lower, which reduces the viscosity of the toner image and makes it easy for the resin particles within the toner image to move. Furthermore, because the toner satisfies Condition (2), the resin particles within the toner image soften at around the temperature at which the viscosity of the toner image begins to decrease, and the softened resin particles gather together to form a network structure. Presumably, this is because the large change of viscosity of the resin particles at around the aforementioned temperature may facilitate the deformation of the resin particles, which may make it easy for the resin particles to tightly adhere to each other. The formation of a network of the resin particles suppresses the permeation of the toner image into the recording medium. Therefore, in an image formed on a recording medium by the toner according to the present exemplary embodiment, transfer failure of a foil is unlikely to occur when foil stamping is performed on the image.

The temperature T0 according to Condition (1) is 50° C. or lower. The temperature T0 is, for example, preferably 0° C. or higher and 50° C. or lower, more preferably 10° C. or higher and 50° C. or lower, and even more preferably 20° C. or higher and 48° C. or lower.

The complex viscosity η* at the temperature T0 according to Condition (2) is $1.0\times10^4$ Pa·s or more. The complex viscosity η* is, for example, preferably $1.0\times10^4$ Pa·s or more and $1.0\times10^8$ Pa·s or less, more preferably $1.0\times10^4$ Pa·s or more and $1.0\times10^7$ Pa·s or less, and even more preferably $1.0\times10^4$ Pa·s or more and $1.0\times10^6$ Pa·s or less.

ΔA according to Condition (2) is 0.2 or more. ΔA is, for example, preferably 0.2 or more and 5 or less, more preferably 0.2 or more and 3 or less, and even more preferably 0.3 or more and 2 or less.

Condition (1) can be achieved, for example, by the content of the crystalline polyester resin contained in the toner particles and the type and amount of monomer of the amorphous polyester resin contained in the toner particles.

Condition (2) can be achieved, for example, by the use of crosslinked resin particles as the resin particles, the type of resin configuring the crosslinked resin particles, and the particle size and content of the crosslinked resin particles.

The dynamic viscoelasticity measurement according to Condition (1) and Condition (2) is performed using a parallel-plate oscillatory rheometer by a strain control method. For Condition (1), pellets obtained by molding the toner particles into a cylindrical shape are used as a sample for measurement. For Condition (2), pellets obtained by molding the resin particles into a cylindrical shape are used as a sample for measurement. The sample is interposed between parallel plates, sinusoidal oscillation is applied to the sample during reheating in the following thermal process, and dynamic viscoelasticity is measured. The measurement conditions are as follows.

Thermal process: heating to 150° C. from 0° C. at a rate of 1° C./min, then cooling to 0° C. from 150° C. at a rate of 1° C./min, followed by reheating to 150° C. from 0° C. at a rate of 1° C./min.

Fixture: parallel plates with diameter of 8 mm

Sample shape: diameter 8 mm, thickness 4 mm

Oscillation frequency: 6.28 rad/sec

Measurement interval: 30 seconds

Strain amount: 0.01% or more and 0.5% or less

From a curve showing the relationship between temperature and the complex viscosity η* obtained by the above measurement using the toner particles as a sample, the temperature T0 according to Condition (1) and Condition (2) is determined. In a case where dynamic viscoelasticity of the toner particles is measured, the complex viscosity η* decreases as the temperature increases. The temperature T0 is a temperature at which the complex viscosity η* reaches $1.0\times10^7$ Pa·s for the first time.

Hereinafter, the components, structure, and manufacturing method of the toner according to the present exemplary embodiment will be described.

Toner Particles

The toner particles contain at least a binder resin and resin particles. The toner particles may contain a colorant, a release agent, and other additives.

Binder Resin

The binder resin contains an amorphous resin and a crystalline resin.

The amorphous resin refers to a resin that does not show a clear endothermic peak but shows a stepwise change in heat absorption in differential scanning calorimetry (DSC). The crystalline resin means a resin having a clear endothermic peak instead of showing a stepwise change in heat absorption in differential scanning calorimetry (DSC).

Specifically, the amorphous resin means a resin which has a half-width more than 10° C. or a resin for which a clear endothermic peak is not observed, and the crystalline resin means a resin which has a half-width of an endothermic peak of 10° C. or less in a case where the resin is measured at a heating rate of 10° C./min.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Amorphous Resin

Examples of the amorphous resin include an amorphous polyester resin, an amorphous vinyl resin (for example, a styrene acrylic resin), an epoxy resin, a polycarbonate resin, a polyurethane resin, and the like. Among these, for example, an amorphous polyester resin and an amorphous vinyl resin (particularly, a styrene acrylic resin) are preferable, and an amorphous polyester resin is more preferable.

Amorphous Polyester Resin

Examples of the amorphous polyester resin include a polycondensate of a polyvalent carboxylic acid and a polyhydric alcohol. As the amorphous polyester resin, a commercially available product or a synthetic product may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that can form a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One polyvalent carboxylic acid may be used alone, or two or more polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, as the polyhydric alcohol, for example, aromatic diols and alicyclic diols are preferable, and aromatic diols are more preferable.

As the polyhydric alcohol, a polyhydric alcohol having a valency of 3 or more that can form a crosslinked structure or a branched structure may be used in combination with a diol. Examples of the polyhydric alcohol having a valency of 3 or more include glycerin, trimethylolpropane, and pentaerythritol.

One polyhydric alcohol may be used alone, or two or more polyhydric alcohols may be used in combination.

The glass transition temperature (Tg) of the amorphous polyester resin is for example, preferably 50° C. or higher and 80° C. or lower, and more preferably 50° C. or higher and 70° C. or lower.

The glass transition temperature of the amorphous polyester resin is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less.

The weight-average molecular weight and the number-average molecular weight of the amorphous polyester resin are measured by gel permeation chromatography (GPC). By GPC, the molecular weight is measured using GPC·HLC-8120GPC manufactured by Tosoh Corporation as a measurement device, TSKgel·Super HM-M (15 cm) manufactured by Tosoh Corporation as a column, and tetrahydrofuran as a solvent. The weight-average molecular weight and the number-average molecular weight are calculated using a molecular weight calibration curve plotted using a monodisperse polystyrene standard sample from the measurement results.

The amorphous polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where a monomer as a raw material is not dissolved or compatible at the reaction temperature, in order to dissolve the monomer, a solvent having a high boiling point may be added as a solubilizer. In this case, a polycondensation reaction is carried out in a state where the solubilizer is being distilled off. In a case where a monomer with poor compatibility takes part in the reaction, for example, the monomer with poor compatibility may be condensed in advance with an acid or an alcohol that is to be polycondensed with the monomer, and then polycondensed with the major component.

From the viewpoint of softening of the binder resin of the toner and ease of movement of the resin particles within the toner image, for example, it is preferable that the amorphous polyester resin include an amorphous polyester resin having an aliphatic dicarboxylic acid unit. One aliphatic dicarboxylic acid unit or two or more aliphatic dicarboxylic acid units may be used.

The aliphatic dicarboxylic acid that provides the aliphatic dicarboxylic acid unit may be any of an aliphatic saturated dicarboxylic acid and an aliphatic unsaturated dicarboxylic acid, and is, for example, preferably an aliphatic saturated dicarboxylic acid.

Examples of the aliphatic saturated dicarboxylic acid include linear dicarboxylic acids such as oxalic acid, malonic acid, succinic acid, glutaric acid, adipic acid, pimelic acid, suberic acid, azelaic acid, and sebacic acid; branched dicarboxylic acids such as methyl malonic acid, ethyl malonic acid, dimethyl malonic acid, methyl succinic acid, 2,2-dimethyl succinic acid, 2,3-dimethyl succinic acid, and tetramethyl succinic acid.

Examples of the aliphatic unsaturated dicarboxylic acid include maleic acid, fumaric acid, citraconic acid, itaconic acid, glutaconic acid.

Among the above aliphatic dicarboxylic acids, for example, a linear aliphatic dicarboxylic acid is preferable, and the number of carbon atoms thereof is, for example, preferably 4 or more and 12 or less.

From the viewpoint of softening of the binder resin of the toner and the ease of movement of the resin particles within the toner image, the mass ratio of the aliphatic dicarboxylic acid unit to all the dicarboxylic acid units of the entire amorphous polyester resin is, for example, preferably 1% by mass or more and 30% by mass or less, more preferably 1% by mass or more and 25% by mass or less, and even more preferably 1% by mass or more and 20% by mass or less.

The structure of the aliphatic dicarboxylic acid is more flexible than the structure of an aromatic carboxylic acid. Therefore, for example, it is preferable that the mass ratio of the aliphatic dicarboxylic acid unit be in the above range, because then the flexibility of the amorphous resin is enhanced.

Crystalline Resin

Examples of the crystalline resin include known crystalline resins such as a crystalline polyester resin, a crystalline vinyl resin (for example, a polyalkylene resin, a long-chain alkyl (meth)acrylate resin, and the like), and the like. From the viewpoint of mechanical strength and low temperature fixability of the toner, for example, a crystalline polyester resin is preferable.

Crystalline Polyester Resin

Examples of the crystalline polyester resin include a polycondensate of a polyvalent carboxylic acid and a polyhydric alcohol. As the crystalline polyester resin, a commercially available product or a synthetic product may be used.

From the viewpoint of ease of forming a crystal structure, the crystalline polyester resin is, for example, preferably a polycondensate which uses not a polymerizable monomer having an aromatic ring but a linear aliphatic polymerizable monomer.

Examples of the polyvalent carboxylic acid include aliphatic dicarboxylic acids (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,18-octadecanedicarboxylic acid, and the like), aromatic dicarboxylic acids (for example, dibasic acids such as phthalic acid, isophthalic acid, terephthalic acid, and naphthalene-2,6-dicarboxylic acid), anhydrides of these, and lower alkyl esters (for example, having 1 or more and 5 or less carbon atoms) of these.

As the polyvalent carboxylic acid, a carboxylic acid having a valency of 3 or more that can form a crosslinked structure or a branched structure may be used in combination with a dicarboxylic acid. Examples of trivalent carboxylic acids include aromatic carboxylic acids (for example, 1,2,3-benzenetricarboxylic acid, 1,2,4-benzenetricarboxylic acid, 1,2,4-naphthalenetricarboxylic acid, and the like), anhydrides of these, and lower alkyl esters (for example, having 1 or more and 5 or less carbon atoms) of these.

As the polyvalent carboxylic acid, a dicarboxylic acid having a sulfonic acid group and a dicarboxylic acid having an ethylenic double bond may be used in combination with dicarboxylic acids.

One polyvalent carboxylic acid may be used alone, or two or more polyvalent carboxylic acids may be used in combination.

Examples of the polyhydric alcohol include an aliphatic diol (for example, a linear aliphatic diol having 7 or more and 20 or less carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, and the like. As the aliphatic diol, among these, for example, 1,8-octanediol, 1,9-nonanediol, and 1,10-decanediol are preferable.

As the polyhydric alcohol, an alcohol that has a valency of 3 or more and can form a crosslinked structure or a branched structure may be used in combination with a diol. Examples of the alcohol having a valency of 3 or more include glycerin, trimethylolethane, trimethylolpropane, pentaerythritol, and the like.

One polyhydric alcohol may be used alone, or two or more polyhydric alcohols may be used in combination.

It is preferable that the polyhydric alcohol contain, for example, an aliphatic diol. The ratio of the aliphatic diol to the polyhydric alcohol is, for example, preferably 80 mol % or more, and more preferably 90 mol % or more.

The melting temperature of the crystalline polyester resin is, for example, preferably 50° C. or higher and 120° C. or lower, more preferably 55° C. or higher and 90° C. or lower, and even more preferably 60° C. or higher and 100° C. or lower.

The melting temperature of the crystalline polyester resin is determined from a DSC curve obtained by differential scanning calorimetry (DSC) by "peak melting temperature" described in the method for determining the melting temperature in JIS K7121-1987, "Testing methods for transition temperatures of plastics".

The weight-average molecular weight (Mw) of the crystalline polyester resin is, for example, preferably 6,000 or more and 50,000 or less.

The ratio of the crystalline resin to the binder resin is, for example, preferably 5% by mass or more and 40% by mass or less, more preferably 10% by mass or more and 35% by mass or less, and even more preferably 15% by mass or more and 30% by mass or less.

The ratio of the crystalline polyester resin to the binder resin is, for example, preferably 5% by mass or more and 40% by mass or less, more preferably 10% by mass or more and 35% by mass or less, and even more preferably 15% by mass or more and 30% by mass or less.

The ratio of the crystalline polyester resin to the total of the amorphous polyester resin and the crystalline polyester resin contained in the toner particles is, for example, preferably 5% by mass or more and 40% by mass or less, more preferably 10% by mass or more and 35% by mass or less, and even more preferably 15% by mass or more and 30% by mass or less.

Resin Particles

Examples of the resin configuring the resin particles include a polyolefin (such as polyethylene or polypropylene), a styrene-based resin (such as polystyrene or α-polymethylstyrene), a (meth)acrylic resin (such as polymethyl methacrylate or polyacrylonitrile), a styrene(meth)acrylic resin, an epoxy resin, a polyurethane resin, a polyurea resin, a polyamide resin, a polycarbonate resin, a polyether resin, a polyester resin, and copolymer resins of these. Each of these resins may be used alone, or two or more of these resins may be used in combination.

As the resin configuring the resin particles, for example, a vinyl-based resin such as a polyolefin, a styrene-based resin, a (meth)acrylic resin, or a styrene(meth)acrylic resin is preferable, and a styrene(meth)acrylic resin is more preferable. That is, for example, the resin particles are preferably vinyl-based resin particles, and more preferably styrene (meth)acrylic resin particles.

The glass transition temperature Tg of the resin particles is, for example, preferably −20° C. or higher and 40° C. or lower, more preferably −10° C. or higher and 30° C. or lower, and even more preferably 0° C. or higher and 25° C. or lower.

From the viewpoint of having appropriate hardness, the resin particles are, for example, preferably crosslinked resin particles. "Crosslinked resin particles" are resin particles containing a resin having a crosslinked structure between atoms. The crosslinked resin is, for example, a crosslinked product of the above resin.

Examples of the crosslinked resin particles include crosslinked resin particles crosslinked by ionic bonds (ionically crosslinked resin particles), crosslinked resin particles crosslinked by covalent bonds (covalently crosslinked resin particles), and the like. As the crosslinked resin particles, for example, crosslinked resin particles crosslinked by covalent bonds are preferable.

Examples of crosslinking agents for crosslinking the resin include aromatic polyvinyl compounds such as divinylbenzene and divinylnaphthalene; polyvinyl esters of aromatic polyvalent carboxylic acids, such as divinyl phthalate, divinyl isophthalate, divinyl terephthalate, divinyl homophthalate, divinyl trimesate, trivinyl trimesate, divinyl naphthalenedicarboxylate, and divinyl biphenylcarboxylate; divinyl esters of nitrogen-containing aromatic compounds, such as divinyl pyridine dicarboxylate; vinyl esters of unsaturated heterocyclic compound carboxylic acid, such as vinyl pyromucate, vinyl furan carboxylate, vinyl pyrrole-2-carboxylate, and vinyl thiophene carboxylate; (meth)acrylic acid esters of linear polyhydric alcohols, such butanediol di(meth)acrylate, hexanediol di(meth)acrylate, octanediol di(meth)acrylate, nonanediol di(meth)acrylate, decanediol di(meth)acrylate, and dodecanediol di(meth)acrylate; (meth) acrylic acid esters of branched substituted polyhydric alcohols, such as neopentylglycol dimethacrylate and 2-hydroxy-1,3-diacryloxypropane; polyvinyl esters of polyvalent carboxylic acids, such as polyethylene glycol di(meth)acrylate, polypropylene polyethylene glycol di(meth)acrylates, divinyl succinate, divinyl fumarate, vinyl maleate, divinyl maleate, divinyl diglycolate, vinyl itaconate, divinyl itaconate, divinyl acetone dicarboxylate, divinyl glutarate, 3,3'-divinylthiodipropionate, divinyl trans-aconitate, trivinyl trans-aconitate, divinyl adipate, divinyl pimelate, divinyl suberate, divinyl azelate, divinyl sebacate, divinyl dodecanedioate, and divinyl brassylate, and the like. One crosslinking agent may be used alone, or two or more crosslinking agents may be used in combination.

The amount of the tetrahydrofuran-insoluble fraction in the crosslinked resin particles is, for example, preferably 70% by mass or more and 99% by mass or less, more preferably 80% by mass or more and 99% by mass or less, and even more preferably 90% by mass or more and 99% by mass or less.

As the crosslinking agent for crosslinking the resin, for example, a polyfunctional (meth)acrylate is preferable, a difunctional (meth)acrylate is more preferable, and at least one difunctional (meth)acrylate selected from the group consisting of a compound represented by the following Formula (A), a compound represented by the following Formula (B), and a compound represented by the following Formula (C) is even more preferable. That is, it is preferable that the crosslinked resin have, for example, a crosslinked structure derived from at least one difunctional (meth) acrylate selected from the group consisting of a compound represented by the following Formula (A), a compound represented by the following Formula (B), and a compound represented by the following Formula (C).

Formula (A)

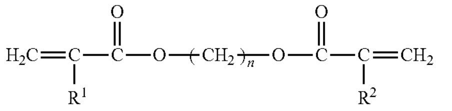

Formula (B)

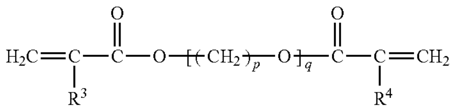

Formula (C)

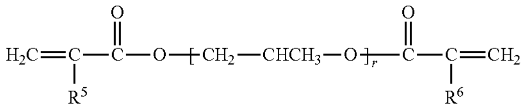

In Formula (A), $R^1$ and $R^2$ each independently represent a hydrogen atom or a methyl group, and n is an integer of 4 or more and 20 or less.

In Formula (B), $R^3$ and $R^4$ each independently represent a hydrogen atom or a methyl group, p is an integer of 2 or more and 4 or less, and q is an integer of 3 or more and 20 or less.

In Formula (C), $R^5$ and $R^6$ each independently represent a hydrogen atom or a methyl group, and r is an integer of 2 or more and 20 or less.

In Formula (A), n is an integer of 4 or more and 20 or less. n is, for example, preferably an integer of 4 or more and 15 or less, and more preferably an integer of 4 or more and 13 or less.

From the viewpoint of appropriately increasing the distance between crosslinking points (that is, from the viewpoint of appropriately lowering the crosslinking density), for example, n is preferably in the above range.

In Formula (B), p is an integer of 2 or more and 4 or less.

In Formula (B), q is an integer of 3 or more and 20 or less. q is, for example, preferably an integer of 3 or more and 15 or less, and more preferably an integer of 3 or more and 12 or less.

From the viewpoint of appropriately increasing the distance between crosslinking points (that is, from the viewpoint of appropriately lowering the crosslinking density), for example, each of p and q is preferably in the above range.

In Formula (C), r is an integer of 2 or more and 20 or less. r is, for example, preferably an integer of 3 or more and 18 or less, and more preferably an integer of 3 or more and 16 or less.

From the viewpoint of appropriately increasing the distance between crosslinking points (that is, from the viewpoint of appropriately lowering the crosslinking density), for example, r is preferably in the above range.

In a case where the distance between crosslinking points is increased using the aforementioned crosslinking agent, resin particles with appropriate flexibility are obtained. As a result, the resin particles are more easily deformed when softened, which makes it easy for the resin particles to form a network structure.

Examples of the compound represented by Formula (A) include 1,4-butanediol di(meth)acrylate, 1,5-pentanediol di(meth)acrylate, 1,6-hexanediol di(meth)acrylate, 1,8-octanediol di(meth)acrylate, 1,9-nonanediol di(meth)acrylate, 1,10-decanediol di(meth)acrylate, 1,12-dodecanediol di(meth)acrylate, 1,13-tridecanediol di(meth)acrylate, 1,20-eicosanediol di(meth)acrylate, and the like.

From the viewpoint of appropriately increasing the distance between crosslinking points, for example, at least one of 1,9-nonanediol di(meth)acrylate, 1,10-decanediol di(meth)acrylate, 1,12-dodecanediol di(meth)acrylate, and 1,13-tridecanediol di(meth)acrylate is preferable.

Examples of the compound represented by Formula (B) include diethylene glycol di(meth)acrylate, triethylene glycol di(meth)acrylate, tetraethylene glycol di(meth)acrylate, tripropylene glycol di(meth)acrylate, polypropylene glycol di(mono) acrylate, and the like.

From the viewpoint of appropriately increasing the distance between crosslinking points, for example, at least one of triethylene glycol di(meth)acrylate, tetraethylene glycol di(meth)acrylate, and tripropylene glycol di(meth)acrylate is preferable.

Examples of the compound represented by Formula (C) include dipropylene glycol di(meth)acrylate, tripropylene glycol di(meth)acrylate, polypropylene glycol di(mono) acrylate, and the like.

The content of the crosslinking agent with respect to the toner particles is, for example, preferably 0.5% by mass or more and 35% by mass or less, more preferably 3% by mass or more and 30% by mass or less, and even more preferably 5% by mass or more and 25% by mass or less.

As the crosslinked resin particles, from the viewpoint of having appropriate viscoelasticity, for example, crosslinked vinyl-based resin particles configured with a crosslinked product of a vinyl-based resin are preferable. As the crosslinked vinyl-based resin, for example, a crosslinked product of a styrene(meth)acrylic resin is preferable. That is, as the crosslinked resin particles, for example, crosslinked styrene (meth)acrylic resin particles are more preferable. Configuring the resin particles with a crosslinked product of a styrene(meth)acrylic resin makes it easy to achieve the storage modulus G' which will be described later.

Examples of the styrene(meth)acrylic resin include resins obtained by polymerizing the following styrene-based monomer and (meth)acrylic acid-based monomer by radical polymerization.

Examples of the styrene-based monomer include styrene, α-methylstyrene, vinylnaphthalene; alkyl-substituted styrene such as 2-methylstyrene, 3-methylstyrene, 4-methylstyrene, 2-ethylstyrene, 3-ethylstyrene, and 4-ethylstyrene; halogen-substituted styrene such as 2-chlorostyrene, 3-chlorostyrene, and 4-chlorostyrene; fluorine-substituted styrene such as 4-fluorostyrene and 2,5-difluorostyrene; and the like. As the styrene-based monomer, for example, styrene and α-methylstyrene are preferable. One styrene-based monomer may be used alone, or two or more styrene-based monomers may be used in combination.

Examples of the (meth)acrylic acid-based monomer include (meth)acrylic acid, methyl (meth)acrylate, ethyl (meth)acrylate, n-propyl (meth)acrylate, n-butyl (meth) acrylate, n-pentyl(meth)acrylate, n-hexyl(meth)acrylate, n-heptyl(meth)acrylate, n-octyl (meth)acrylate, n-decyl (meth)acrylate, n-dodecyl (meth)acrylate, n-lauryl (meth) acrylate, n-tetradecyl(meth)acrylate, n-hexadecyl(meth) acrylate, n-octadecyl(meth)acrylate, isopropyl (meth) acrylate, isobutyl (meth)acrylate, t-butyl (meth)acrylate, isopentyl (meth)acrylate, neopentyl (meth)acrylate, isohexyl (meth)acrylate, isoheptyl(meth)acrylate, isooctyl (meth) acrylate, 2-ethylhexyl (meth)acrylate, phenyl (meth)acrylate, biphenyl (meth)acrylate, diphenyl ethyl (meth)acrylate, t-butylphenyl (meth)acrylate, terphenyl (meth)acrylate, cyclohexyl (meth)acrylate, t-butylcyclohexyl (meth)acrylate, dimethylaminoethyl (meth)acrylate, diethylaminoethyl (meth)acrylate, methoxyethyl (meth)acrylate, 2-hydroxyethyl (meth)acrylate, 2-carboxyethyl (meth)acrylate, 2-carboxypropyl (meth)acrylate, 3-carboxypropyl (meth)acrylate, 4-carboxybutyl (meth)acrylate, (meth)acrylonitrile, (meth)acrylamide, and the like. One (meth)acrylic acid-based monomer may be used alone, or two or more (meth) acrylic acid-based monomers may be used in combination.

As the (meth)acrylic acid-based monomer, for example, a (meth)acrylic acid lower alkyl ester is preferable. In the (meth)acrylic acid lower alkyl ester, "lower alkyl" means an alkyl having 1 or more and 5 or less carbon atoms. "Lower alkyl" is, for example, preferably an alkyl having 2 or more and 4 or less carbon atoms, and more preferably an alkyl having 3 or 4 carbon atoms.

Examples of the (meth)acrylic acid lower alkyl ester include methyl (meth)acrylate, ethyl (meth)acrylate, n-propyl (meth)acrylate, n-butyl (meth)acrylate, n-pentyl(meth) acrylate, isopropyl (meth)acrylate, isobutyl (meth)acrylate, t-butyl (meth)acrylate, isopentyl (meth)acrylate, neopentyl (meth)acrylate, and the like. Among these, for example, ethyl (meth)acrylate, n-propyl (meth)acrylate, and n-butyl (meth)acrylate are preferable, and n-butyl (meth)acrylate is particularly preferable.

The polymerization ratio between the styrene-based monomer and the (meth)acrylic acid-based monomer (styrene-based monomer:(meth)acrylic acid-based monomer based on mass) is, for example, preferably 30:70 to 70:30, more preferably 40:60 to 60:40, and even more preferably 45:55 to 55:45.

As the crosslinking agent configuring the crosslinked styrene(meth)acrylic resin, for example, a polyfunctional (meth)acrylate is preferable, a difunctional (meth)acrylate is more preferable, and at least one difunctional (meth)acrylate selected from the group consisting of a compound represented by Formula (A) and a compound represented by Formula (B) is even more preferable. That is, it is preferable that the crosslinked styrene(meth)acrylic resin have, for example, a crosslinked structure derived from at least one difunctional (meth)acrylate selected from the group consisting of a compound represented by Formula (A) and a compound represented by Formula (B).

In a case where dynamic viscoelasticity of the crosslinked resin particles is measured, a storage modulus G' of the crosslinked resin particles at a temperature 100° C. higher than a temperature T0 is, for example, preferably $1.0\times10^4$ Pa or more. The temperature T0 is the same as the temperature T0 according to Condition (1) and Condition (2). The temperature 100° C. higher than the temperature T0 is a reference temperature for fixing.

From the viewpoint of suppressing permeation into a recording medium, it is preferable that the crosslinked resin particles have, for example, the above characteristics. In this respect, the storage modulus G' is, for example, more preferably $1.0\times10^4$ Pa or more and $1.0\times10^8$ Pa or less, and even more preferably $1.0\times10^5$ Pa or more and $1.0\times10^7$ Pa or less.

From the viewpoint of easily obtaining the above characteristics relating to the storage modulus G', the crosslinked resin particles are, for example, preferably crosslinked styrene(meth)acrylic resin particles. It is possible to control the storage modulus G' of the crosslinked styrene(meth)acrylic resin particles by the type of monomer configuring the crosslinked styrene(meth)acrylic resin particles, the polymerization ratio of the monomer, the amount of the crosslinking agent, the timing for adding the crosslinking agent during a polymerization reaction, the internal temperature of the reaction system of the polymerization reaction, the stirring rate, and the like.

The dynamic viscoelasticity of the crosslinked resin particles relating to the storage modulus G' is measured as follows.

Pressure is applied to the crosslinked resin particles to form a disk having a thickness of 2 mm and a diameter of 8 mm, thereby preparing a sample for measurement. Examples of the method of isolating the crosslinked resin particles from the toner particles include a method of immersing the toner particles in a solvent that dissolves the binder resin but does not dissolve the crosslinked resin particles and collecting the crosslinked resin particles.

The sample for measurement is interposed between parallel plates having a diameter of 8 mm, and dynamic viscoelasticity is measured using a dynamic viscoelasticity measuring device (rheometer ARES-G2, manufactured by TA Instruments.) at a gap of 3 mm, a frequency of 1 Hz, and a strain amount of 0.1% to 100% with heating from 25° C. to 150° C. at a rate of 1° C./min. From the curve showing the relationship between temperature and the storage modulus G' obtained by the measurement, the storage modulus G' at a temperature 100° C. higher than the temperature T0 is determined.

From the viewpoint of suppressing permeation into a recording medium, the average particle size of the crosslinked resin particles is, for example, preferably 100 nm or more and 300 nm or less, more preferably 110 nm or more and 250 nm or less, and even more preferably 110 nm or more and 240 nm or less.

In a case where Dt (μm) represents a volume-average particle size of the toner particles and a region from the surface of the toner particles to a depth (Dt/5) μm is defined as a surface layer portion, the ratio of the total area of the crosslinked resin particles contained in the surface layer portion to the total area of the surface layer portion is, for example, preferably 3% or more and 20% or less in observation of cross sections of the toner particles. In a case where the surface layer portion of the toner particles contains an appropriate amount of the crosslinked resin particles, the crosslinked resin particles gather together in a case where heat and pressure are applied to the toner image, which facilitates the formation of a network structure. In this respect, the area ratio of the crosslinked resin particles contained in the surface layer portion is, for example, more preferably 5% or more and 20% or less, and even more preferably 5% or more and 18% or less.

In a case where toner particles having a core/shell structure are manufactured by the aggregation and coalescence method, the above characteristics can be controlled by the amounts of surfactants added to a core layer, the amounts of various resin particle dispersions for forming a shell layer, and adjustment of the internal temperature and pH of the reaction system during the addition of the surfactants and resin particle dispersions.

The average particle size of the crosslinked resin particles and the area ratio of the crosslinked resin particles in the surface layer portion are measured by the following method.

The toner is mixed with and embedded in an epoxy resin, and the epoxy resin is solidified. A thin sample having a thickness of 80 nm or more and 130 nm or less is prepared using an ultramicrotome device. The thin sample is stained with osmium tetroxide in a desiccator at 30° C. for 3 hours. An SEM image of the stained thin sample is captured with an ultra-high resolution field-emission scanning electron microscope (S-4800, Hitachi High-Tech Corporation.). Each component is identified based on the light and shade resulting from the degree of staining. In a case where it is difficult to distinguish the light and shade due to the condition of the sample or the like, the staining time is adjusted.

The SEM image is analyzed with the image analysis software WinRoof (MITANI CORPORATION). Within the SEM image, cross sections of toner particles having a long diameter that is equal to or more than 85% of the volume-average particle size of the toner particles are selected, and the crosslinked resin particles are observed. The circular equivalent diameter of the crosslinked resin particles is adopted as the particle size of the crosslinked resin particles. For the plurality of toner particles, the particle sizes of 300 crosslinked resin particles are measured, and the arithmetic mean thereof is adopted as an average particle size (nm).

In addition, within the SEM image, 100 cross sections of toner particles having a long diameter that is equal to or more than 85% of the volume-average particle size of the toner particles are selected. For the 100 toner particles, the area of the surface layer portion which is in other words a region from the contour of each toner particle to a depth (Dt/5) μm and the total area of the crosslinked resin particles contained in the surface layer portion are determined, and the ratio (%) of the total area of the crosslinked resin particles to the area of the surface layer portion is calculated. In a case where one crosslinked resin particle spans both the surface layer portion and a region other than the surface layer portion, the area of the portion included in the surface layer portion is defined as the area of the crosslinked resin particle contained in the surface layer portion. Dt represents the volume-average particle size (μm) of the toner particles, and the volume-average particle size of the toner particles is measured by the method that will be described later.

From the viewpoint of causing the crosslinked resin particles to gather together in a case where heat and pressure are applied to the toner image and making it easy for the crosslinked resin particles to form a network structure, the mass ratio of the crosslinked resin particles to the toner particles is, for example, preferably 1% by mass or more and 30% by mass or less, more preferably 3% by mass or more and 25% by mass or less, and even more preferably 5% by mass or more and 20% by mass or less.

Colorant

Examples of colorants include pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye, and inorganic pigments such as a titanium compound and silica.

The colorant is not limited to a substance having absorption in the visible light region. The colorant may be, for example, a substance having absorption in a near-infrared region or a fluorescent colorant.

Examples of the colorant having absorption in the near-infrared region include an aminium salt-based compound, a naphthalocyanine-based compound, a squarylium-based compound, a croconium-based compound, and the like.

Examples of the fluorescent colorant include the fluorescent colorants described in paragraph "0027" of JP2021-127431A.

The colorant may be a luminous colorant. Examples of the luminous colorant include metal powder such as aluminum, brass, bronze, nickel, stainless steel, or zinc; mica coated with titanium oxide or yellow iron oxide; a coated flaky inorganic crystal substrate such as barium sulfate, layered silicate, or silicate of layered aluminum; monocrystal plate-shaped titanium oxide, basic carbonate, bismuth oxychloride, natural guanine, flaky glass powder, metal-deposited flaky glass powder; and the like.

One colorant may be used alone, or two or more colorants may be used in combination.

As the colorant, a colorant having undergone a surface treatment as necessary may be used, or a dispersant may be used in combination with the colorant.

In the present exemplary embodiment, the toner particles may or may not contain a colorant. The toner according to the present exemplary embodiment may be a so-called transparent toner which is a toner having toner particles that do not contain a colorant.

In a case where the toner particles of the present exemplary embodiment contain a colorant, the content of the colorant with respect to the total amount of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral/petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total mass of the toner particles is, for example, preferably 1% by mass or more and 20% by mass or less, and more preferably 5% by mass or more and 15% by mass or less.

In a case where Ww represents the content of the release agent contained in the toner particles and Wp represents the content of the crosslinked resin particles, a ratio Ww/Wp is, for example, preferably 0.03 or more and 10 or less. In a case where such a characteristic is satisfied, the crosslinked resin particles gather together in a case where heat and pressure are applied to the toner image, which facilitates the formation of a network structure. The ratio Ww/Wp is, for example, more preferably 0.1 or more and 8 or less, and even more preferably 0.1 or more and 5 or less.

In a case where Dt (μm) represents a volume-average particle size of the toner particles and a region from the surface of the toner particles to a depth (Dt/5) μm is defined as a surface layer portion, the ratio of the total area of the release agent contained in the surface layer portion to the total area of the surface layer portion is, for example, preferably 1% or more and 20% or less in observation of cross sections of the toner particles. In a case where the surface layer portion of the toner particles contains an appropriate amount of the release agent, the viscosity of the toner image is likely to decrease in a case where heat and pressure are applied to the toner image. As a result, the release agents gather together and easily form a network structure. In this respect, the area ratio of the release agent contained in the surface layer portion is, for example, more preferably 1% or more and 15% or less, and even more preferably 1% or more and 10% or less.

In a case where toner particles having a core/shell structure are manufactured by the aggregation and coalescence method, the above characteristics can be controlled by the amounts of surfactants added to a core layer, the amounts of various resin particle dispersions for forming a shell layer, and adjustment of the internal temperature and pH of the reaction system during the addition of the surfactants and resin particle dispersions.

The area ratio of the release agent in the surface layer portion is measured by the following method.

The toner is mixed with and embedded in an epoxy resin, and the epoxy resin is solidified. A thin sample having a thickness of 80 nm or more and 130 nm or less is prepared using an ultramicrotome device. The thin sample is stained with osmium tetroxide in a desiccator at 30° C. for 3 hours. An SEM image of the stained thin sample is captured with an ultra-high resolution field-emission scanning electron microscope (S-4800, Hitachi High-Tech Corporation.). Each component is identified based on the light and shade resulting from the degree of staining. In a case where it is difficult to distinguish the light and shade due to the condition of the sample or the like, the staining time is adjusted.

The SEM image is analyzed with the image analysis software WinRoof (MITANI CORPORATION). Within the SEM image, 100 cross sections of toner particles having a long diameter that is equal to or more than 85% of the volume-average particle size of the toner particles are selected. For the 100 toner particles, the area of the surface layer portion which is in other words a region from the contour of each toner particle to a depth (Dt/5) μm and the total area of the release agent contained in the surface layer portion are determined, and the ratio (%) of the total area of the release agent domain to the area of the surface layer portion is calculated. In a case where one release agent domain spans both the surface layer portion and a region other than the surface layer portion, the area of the portion included in the surface layer portion is defined as the area of the release agent domain contained in the surface layer portion. Dt represents the volume-average particle size (μm) of the toner particles, and the volume-average particle size of the toner particles is measured by the method that will be described later.

Other Additives

Examples of other additives include known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

In a case where the toner particles have a core/shell structure, for example, the core particles and the shell layer preferably both contain resin particles, more preferably both contain crosslinked resin particles, and even more preferably both contain crosslinked styrene(meth)acrylic resin particles.

The toner particles with a core/shell structure have, for example, core particles that contain a binder resin, crosslinked resin particles, a colorant, and a release agent, and a shell layer that contains a binder resin, crosslinked resin particles, and a release agent.

The volume-average particle size (D50v) of the toner particles is, for example, preferably 2 μm or more and 10 μm or less, and more preferably 4 μm or more and 8 μm or less.

The volume-average particle size (D50v) of the toner particles is measured using COULTER MULTISIZER II (manufactured by Beckman Coulter Inc.) and using ISOTON-II (manufactured by Beckman Coulter Inc.) as an electrolytic solution. For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The obtained solution is added to an electrolytic solution in a volume of 100 ml or more and 150 ml or less. The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

The average circularity of the toner particles is, for example, preferably 0.94 or more and 1.00 or less, and more preferably 0.95 or more and 0.98 or less.

The average circularity of the toner particles is determined by (circular equivalent perimeter)/(perimeter) [(perimeter of circle having the same projected area as particle image)/(perimeter of projected particle image)]. Specifically, the average circularity is a value measured by the following method.

Toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

External Additive

Examples of the external additives include inorganic particles. Examples of the inorganic particles include $SiO_2$, $TiO_2$, $A_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, $MgSO_4$, and the like.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, an aluminum-based coupling agent, and the like. Each of these agents may be used alone, or two or more of these agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

From the viewpoint of suppressing permeation into a recording medium, the average particle size of the external additive is, for example, preferably 50 nm or more and 500 nm or less, more preferably 50 nm or more and 400 nm or less, and even more preferably 50 nm or more and 300 nm or less.

In a case where the external additive is inorganic particles, from the viewpoint of suppressing permeation into a recording medium, the average particle size of the inorganic particles is, for example, preferably 50 nm or more and 500 nm or less, more preferably 50 nm or more and 400 nm or less, and even more preferably 50 nm or more and 300 nm or less.

In the present exemplary embodiment, the particle size of the external additive is the diameter of a circle having the same area as the area of the particle image (so-called circular equivalent diameter), and the average particle size of the external additive is a particle size below which the cumulative percentage of particles smaller than this size reaches 50% in a number-based particle size distribution. The particle size of the external additive is determined by capturing an electron micrograph of the toner containing an external additive added to the exterior of the toner, and performing image analysis on at least 300 external additives on the toner particles.

From the viewpoint of suppressing permeation into a recording medium, the amount of the external additive added to the exterior of the toner particles with respect to 100 parts by mass of the toner particles is, for example, preferably 0.3 parts by mass or more and 20 parts by mass or less, more preferably 0.3 parts by mass or more and 10 parts by mass or less, and even more preferably 0.3 parts by mass or more and 8 parts by mass or less.

Manufacturing Method of Toner

The toner according to the present exemplary embodiment is obtained by manufacturing toner particles and then adding external additives to the exterior of the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no restrictions on these manufacturing methods, and known manufacturing methods are adopted. Among the above methods, for example, the aggregation and coalescence method may be used for obtaining toner particles.

Specifically, for example, in a case where the toner particles are manufactured by the aggregation and coalescence method, the toner particles are manufactured through a step of preparing an amorphous resin particle dispersion in which amorphous resin particles are dispersed, a crystalline resin particle dispersion in which crystalline resin particles are dispersed, and a crosslinked resin particle dispersion in which crosslinked resin particles are dispersed (resin particle dispersion-preparing step), a step of forming aggregated particles by aggregating the amorphous resin particles, the crystalline resin particles, and the crosslinked resin particles (and other particles as necessary) in a dispersion obtained by mixing together the amorphous resin particle dispersion, the crystalline resin particle dispersion, and the crosslinked resin particle dispersion (a dispersion obtained after other particle dispersions are mixed in as necessary) (aggregated particle-forming step), and a step of coalescing the aggregated particles by heating an aggregated particle dispersion containing the aggregated particle dispersed to form toner particles (coalescence step).

Hereinafter, each of the steps will be specifically described.

In the following section, a method of obtaining toner particles containing a colorant and a release agent will be described. The colorant and the release agent are used as necessary. It goes without saying that other additives different from the colorant and the release agent may also be used.

Resin Particle Dispersion-Preparing Step

The amorphous resin particle dispersion is prepared, for example, by dispersing the amorphous resin particles in a dispersion medium by using a surfactant. The crystalline resin particle dispersion is prepared, for example, by dispersing the crystalline resin particles in a dispersion medium by using a surfactant.

Examples of the dispersion medium used for the resin particle dispersion include an aqueous medium.

Examples of the aqueous medium include distilled water, water such as deionized water, alcohols, and the like. Each of these media may be used alone, or two or more of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant. One surfactant may be used alone, or two or more surfactants may be used in combination.

As for the resin particle dispersion, examples of the method of dispersing resin particles in the dispersion medium include general dispersion methods such as a rotary shearing homogenizer, a ball mill having media, a sand mill, and a dyno mill. Depending on the type of resin particles, the resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes phase transition from W/O to O/W and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

As a method of preparing the crosslinked resin particle dispersion, for example, known methods such as an emulsion polymerization method, a melt kneading method using a Banbury mixer or a kneader, a suspension polymerization method, and a spray drying method are used. Among these, for example, an emulsion polymerization method is preferable.

From the viewpoint of making the storage modulus G' of the crosslinked resin particles fall into the preferable range, for example, it is preferable to use a styrene-based monomer and a (meth)acrylic acid-based monomer and polymerize these in an emulsion in the presence of a crosslinking agent. It is preferable that the emulsification polymerization be performed, for example, in a plurality of times.

The method of preparing the crosslinked resin particle dispersion preferably includes, for example, a step of obtaining an emulsion containing a monomer, a crosslinking agent, a surfactant, and water (emulsion-preparing step), a step of adding a polymerization initiator to the emulsion and then heating the emulsion to polymerize the monomer (first emulsion polymerization step), and a step of adding an emulsion containing a monomer and a crosslinking agent to a reaction solution obtained after the first emulsion polymerization step and then heating the solution to polymerize the monomer (second emulsion polymerization step).

Emulsion-Preparing Step

For example, it is preferable to obtain the emulsion by emulsifying a monomer, a crosslinking agent, a surfactant, and water by using an emulsifying machine. Examples of the emulsifying machine include a rotary stirrer equipped with a propeller type, anchor type, paddle type, or turbine type stirring blade, a stationary mixer such as a static mixer, and a rotor/stator type emulsifying machine such as a homogenizer or Clare mix, a mill type emulsifying machine having grinding function, a high-pressure emulsifying machine such as a Munton Gaulin-type pressure emulsifying machine, a high-pressure nozzle type emulsifying machine that causes cavitation under high pressure, a high-pressure impact-type emulsifying machine, such as a microfluidizer, which generates shearing force by causing collision of liquids under high pressure, an ultrasonic emulsifying machine that causes cavitation by using ultrasonic waves, a membrane emulsifying machine that performs uniform emulsification through pores, and the like.

As the monomer, for example, it is preferable to use a styrene-based monomer and a (meth)acrylic acid-based monomer. As the crosslinking agent, for example, a polyfunctional (meth)acrylate is preferable, a difunctional (meth)acrylate is more preferable, and at least one difunctional (meth)acrylate selected from the group consisting of a compound represented by Formula (A) and a compound represented by Formula (B) is even more preferable.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. The nonionic surfactant may be used in combination with an anionic surfactant or a cationic surfactant. Among these, an anionic surfactant is preferable, for example. One surfactant may be used alone, or two or more surfactants may be used in combination.

The emulsion may contain a chain transfer agent. Examples of the chain transfer agent include compounds having a thiol component. Specifically, for example, alkyl mercaptans such as hexyl mercaptan, heptyl mercaptan, octyl mercaptan, nonyl mercaptan, decyl mercaptan, and dodecyl mercaptan are preferable.

First Emulsion Polymerization Step

This is a step of adding a polymerization initiator to the emulsion and then heating the emulsion to polymerize the monomer.

As the polymerization initiator, for example, it is preferable to use ammonium persulfate. The amount of the polymerization initiator added may be adjusted to control the viscoelasticity of the crosslinked resin particles. For example, reducing the amount of the polymerization initiator added makes it easy to obtain crosslinked resin particles having a high storage modulus G'.

In polymerizing the monomer, for example, it is preferable to stir the emulsion (reaction solution) containing the polymerization initiator with a stirrer. Examples of the stirrer include a rotary stirrer equipped with a propeller type, anchor type, paddle type, or turbine type stirring blade.

Second Emulsion Polymerization Step

This is a step of adding an emulsion containing a monomer to the reaction solution obtained after the first emulsion polymerization step and then heating the reaction solution to polymerize the monomer. The emulsion to be added is preferably obtained, for example, by emulsifying the monomer, the surfactant, and water with an emulsifying machine. In polymerizing the monomers, for example, it is preferable to stir the reaction solution as in the first emulsion polymerization step.

The time required for adding the emulsion containing the monomer may be adjusted such that the viscoelasticity of the obtained crosslinked resin particles is controlled. For example, increasing the time required for adding the emulsion containing the monomer makes it easy to obtain crosslinked resin particles having a high storage modulus G'. The time required for adding the emulsion containing the monomer is, for example, in a range of 2 hours or more and 5 hours or less.

The temperature during stirring of the reaction solution may be adjusted to control the viscoelasticity of the crosslinked resin particles. For example, reducing the temperature at which the reaction solution is stirred makes it easy to obtain crosslinked resin particles having a high storage modulus G'. The temperature at which the reaction solution is stirred is, for example, in a range of 55° C. or higher and 75° C. or lower.

Aggregated Particle-Forming Step

The amorphous resin particle dispersion, the crystalline resin particle dispersion, the crosslinked resin particle dispersion, the colorant particle dispersion, and the release agent particle dispersion are mixed together. Then, in the mixed dispersion, the amorphous resin particles, the crystalline resin particles, the crosslinked resin particles, the colorant particles, and the release agent particles are hetero-aggregated such that aggregated particles having a diameter close to the diameter of the target toner particles are formed.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Then, the dispersion is heated to a temperature close to the glass transition temperature of the amorphous resin particles (specifically, for example, to a temperature equal to or higher than the glass transition temperature of the amorphous resin particles −30° C. and equal to or lower than the glass transition temperature of the amorphous resin particles −10° C.) such that the particles dispersed in the mixed dispersion are aggregated, thereby forming aggregated particles. In the aggregated particle-forming step, for example, in a state where the mixed dispersion is being stirred with a rotary shearing homogenizer, an aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

The temperature of the mixed dispersion to which the aggregating agent is added may be adjusted such that the dispersion state of the crosslinked resin particles in the obtained toner particles is controlled. For example, reducing the temperature of the mixed dispersion enables the crosslinked resin particles to exhibit excellent dispersibility. The temperature of the mixed dispersion is, for example, in a range of 5° C. or higher and 40° C. or lower.

The stirring rate after the addition of the aggregating agent may be adjusted such that the dispersion state of the crosslinked resin particles in the obtained toner particles is controlled. For example, increasing the stirring rate after the addition of the aggregating agent enables the crosslinked resin particles to exhibit excellent dispersibility.

Examples of the aggregating agent include a surfactant having polarity opposite to the polarity of the surfactant contained in the mixed dispersion, an inorganic metal salt, and a metal complex having a valency of 2 or more. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the amorphous resin particles (for example, a temperature higher than the glass transition temperature of the amorphous resin particles by 10° C. to 30° C.) such that the aggregated particles coalesce, thereby forming toner particles.

Toner particles are obtained through the above steps.

The toner particles may be manufactured through a step of obtaining second aggregated particles by mixing the amorphous resin particle dispersion with the aggregated particle dispersion after the aggregated particle dispersion is obtained and aggregating the particles such that amorphous resin particles adhere to the surface of the aggregated particles, and a step of forming toner particles having a core/shell structure by heating a second aggregated particle dispersion in which the second aggregated particles are dispersed such that the second aggregated particles coalesce.

After the step of forming second aggregated particles, a surfactant (for example, preferably an anionic surfactant) may be added. In a case where a surfactant is added, it is easy to obtain toner particles containing crosslinked resin particles that are extremely uniformly dispersed.

After the coalescence step ends, the toner particles in the dispersion are subjected to known washing step, solid-liquid separation step, and drying step, thereby obtaining dry toner particles. As the washing step, from the viewpoint of charging properties, for example, displacement washing may be thoroughly performed using deionized water. As the solid-liquid separation step, from the viewpoint of productivity, for example, suction filtration, pressure filtration, or the like may be performed. As the drying step, from the viewpoint of productivity, for example, freeze-drying, flush drying, fluidized drying, vibratory fluidized drying, or the like may be performed.

Then, for example, by adding an external additive to the obtained dry toner particles and mixing together the external additive and the toner particles, the toner according to the present exemplary embodiment is manufactured. The mixing may be performed, for example, using a V blender, a Henschel mixer, a Lödige mixer, or the like. As necessary, coarse particles of the toner may be removed using a Vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin and; a resin impregnation-type carrier obtained by impregnating porous magnetic powder with a resin; and the like.

Each of the magnetic powder dispersion-type carrier and the resin impregnation-type carrier may be a carrier obtained by coating the surface of a core material, which is particles configuring the carrier, with a resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the toner and the carrier, represented by toner:carrier, in the two-component developer is, for example, preferably 1:100 to 30:100, and more preferably 3:100 to 20:100.

Image Forming Apparatus and Image Forming Method

The image forming apparatus and image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In a case where the image forming apparatus according to the present exemplary embodiment is the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) detachable from the image forming apparatus. As the process cartridge, for example, a process cartridge is suitably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that prints out images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are detachable from the image forming apparatus.

An intermediate transfer belt (an example of an intermediate transfer member) 20 passing through the units 10Y, 10M, 10C, and 10K extends above the units. The intermediate transfer belt 20 is looped around a driving roll 22 and a support roll 24, and runs toward a fourth unit 10K from a first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the side of the image holding surface of the intermediate transfer belt 20.

Toners of yellow, magenta, cyan, and black, stored in containers of toner cartridges 8Y, 8M, 8C, and 8K are supplied to developing devices (an example of developing units) 4Y, 4M, 4C, and 4K of units 10Y, 10M, 10C, and 10K, respectively.

The first to fourth units 10Y, 10M, 10C, and 10K have the same configuration and perform the same operation. Therefore, in the present specification, as a representative, the first unit 10Y will be described which is placed on the upstream side of the running direction of the intermediate transfer belt and forms a yellow image.

The first unit 10Y has a photoreceptor 1Y that acts as an image holder. Around the photoreceptor 1Y, a charging roll 2Y (an example of charging unit) that charges the surface of the photoreceptor 1Y at a predetermined potential, an exposure device 3 (an example of electrostatic charge image forming unit) that exposes the charged surface to a laser beam 3Y based on color-separated image signals to form an electrostatic charge image, a developing device 4Y (an example of developing unit) that develops the electrostatic charge image by supplying a charged toner to the electrostatic charge image, a primary transfer roll 5Y (an example of primary transfer unit) that transfers the developed toner image onto the intermediate transfer belt 20, and a photoreceptor cleaning device 6Y (an example of cleaning unit) that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. A bias power supply (not shown in the drawing) for applying a primary transfer bias is connected to primary transfer rolls 5Y, 5M, 5C, and 5K of each unit. Each bias power supply changes the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with a laser beam, the specific resistance of the portion irradiated with the laser beam changes. Therefore, from an exposure device 3, the laser beam 3Y is radiated to the surface of the charged photoreceptor 1Y according to the image data for yellow transmitted from the control unit not shown in the drawing. As a result, an electrostatic charge image of the yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y rotates to a predetermined development position as the photoreceptor 1Y runs. At the development position, the electrostatic charge image on the photoreceptor 1Y is developed as a toner image by the developing device 4Y and visualized.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. In the first unit 10Y, the transfer bias is set, for example, to +10 μA under the control of the control unit (not shown in the drawing).

The residual toner on the photoreceptor 1Y is removed by a photoreceptor cleaning device 6Y and collected.

The primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of a secondary transfer unit) disposed on the side of the image holding surface of the intermediate transfer belt 20. Meanwhile, via a supply mechanism, recording paper P (an example of a recording medium) is fed at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Then, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth. For instance, coated paper prepared by coating the surface of plain paper with a resin or the like, art paper for printing, and the like are suitably used.

The recording paper P on which the color image has been fixed is transported to an output portion, and a series of color image forming operations is finished.

Process Cartridge and Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing unit and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
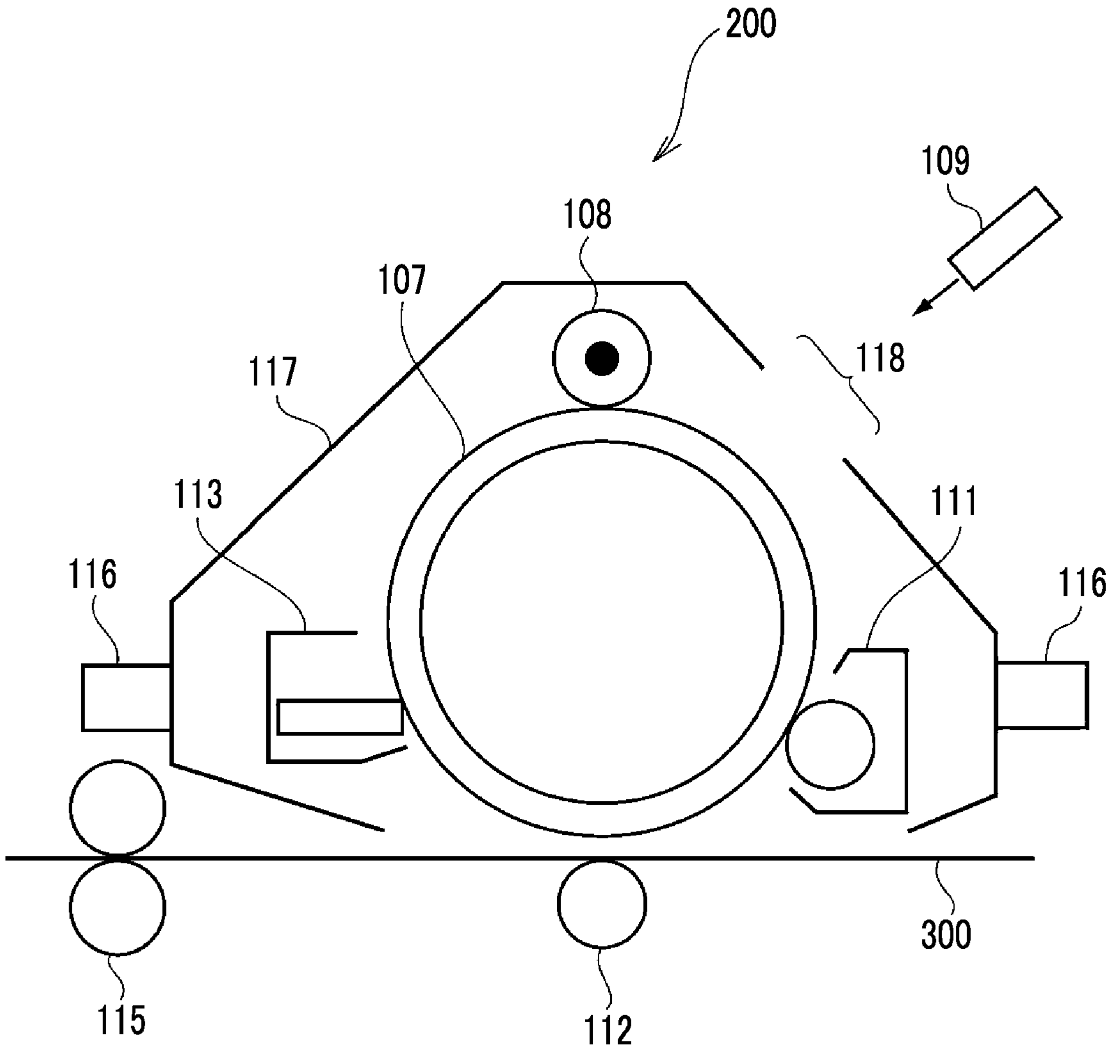
FIG. 2 is a view schematically showing the configuration of an example of a process cartridge detachable from the image forming apparatus according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of an image holder), a charging roll 108 (an example of a charging unit) that is provided on the periphery of the photoreceptor 107, a developing device 111 (an example of a developing unit), a photoreceptor cleaning device 113 (an example of a cleaning unit), which are integrally combined and held in the housing 117. The process cartridge 200 forms a cartridge in this way.

In FIG. 2, 109 represents an exposure device (an example of an electrostatic charge image forming unit), 112 represents a transfer device (an example of a transfer unit), 115 represents a fixing device (an example of a fixing unit), and 300 represents recording paper (an example of a recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Hereinafter, exemplary embodiments of the invention will be specifically described based on examples. However, the exemplary embodiments of the invention are not limited to the examples.

In the following description, unless otherwise specified, "parts" and "%" are based on mass.

Unless otherwise specified, synthesis, treatment, manufacturing, and the like are carried out at room temperature (25° C.±3° C.).

Example 1

Preparation of Amorphous Polyester Resin Particle Dispersion

Terephthalic acid: 79 parts
Adipic acid: 4 parts
Propylene oxide (2 mol) adduct of bisphenol A: 172 parts The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydration condensation reaction is continued for 3 hours in the reaction solution kept at 240° C., and then the reactant is cooled.

The molten reactant is transferred as it is to CAVITRON CD1010 (manufactured by Eurotech Ltd.) at a rate of 100 g/min. At the same time, separately prepared 0.37% aqueous ammonia solution is transferred to CAVITRON CD1010 at a rate of 0.1 L/min in a state of being heated at 120° C. with a heat exchanger. CAVITRON CD1010 is operated under the conditions of a rotation speed of a rotor of 60 Hz and a pressure of 5 kg/$cm^2$, thereby obtaining a resin particle dispersion. Deionized water is added to the resin particle dispersion, thereby obtaining an amorphous polyester resin particle dispersion (1) having a solid content of 30%. The volume-average particle size of resin particles in the amorphous polyester resin particle dispersion (1) is 160 nm.

Preparation of Crystalline Polyester Resin Particle Dispersion 1,10-Dodecanedioic acid: 225 parts
1,6-Hexanediol: 174 parts The above materials are put in a reactor equipped with a stirrer, a nitrogen introduction tube, a temperature sensor, and a rectifying column, the temperature is raised to 160° C. for 1 hour, and 0.8 parts of dibutyltin oxide is added thereto. While the generated water is being distilled off, the temperature is raised to 180° C. for 6 hours, and the mixture is stirred for 5 hours in a state of being kept at 180° C. and refluxed such that the reaction proceeds. Then, the temperature is slowly raised to 230° C. under reduced pressure (3 kPa), and the reaction solution is stirred for 2 hours in a state of being kept at 230° C. Thereafter, the reactant is cooled. After cooling, solid-liquid separation is performed, and the solids are dried, thereby obtaining a crystalline polyester resin (1). The melting point of the crystalline polyester resin (1) is 63° C.

Crystalline polyester resin (1): 100 parts
Methyl ethyl ketone: 40 parts
Isopropanol: 30 parts
10% Aqueous ammonia solution: 6 parts The above materials are put in a jacketed reaction vessel equipped with a condenser, a thermometer, a water dripping device, and an anchor blade. In a state where the liquid temperature is being kept at 80° C. in a water circulation-type thermostatic bath, and the materials are being stirred and mixed together at 100 rpm, the resin is dissolved. Then, the water circulation-type thermostatic bath is set to 50° C., and a total of 400 parts of deionized water kept at 50° C. is added dropwise thereto at a rate of 10 parts/min such that phase transition occurs, thereby obtaining an emulsion. The obtained emulsion (576 parts) and 500 parts of deionized water are put in an eggplant flask and set in an evaporator equipped with a vacuum controlled unit via a trap ball. While being rotated, the eggplant flask is heated in a hot water bath at 60° C., and the pressure is reduced to 7 kPa with care to sudden boiling, thereby removing the solvent. At a point in time when the amount of solvent collected reaches 750 parts, the pressure is returned to normal pressure, and the eggplant flask is cooled in water, thereby obtaining a dispersion. Deionized water is added to the dispersion, thereby obtaining a crystalline polyester resin particle dispersion (1) having a solid content of 30%. The volume-average particle size of resin particles in the crystalline polyester resin particle dispersion (1) is 110 nm.

Preparation of Crosslinked Resin Particle Dispersion

Styrene: 50 parts
n-Butyl acrylate: 50 parts
Tetraethylene glycol diacrylate: 2.0 parts The above materials are added to a mixing vessel equipped with a stirrer and stirred. A mixed solution of 1.5 parts of an anionic surfactant (DOWFAX 2a1 manufactured by The Dow Chemical Company) and 60 parts of deionized water is added to a mixing vessel and stirred, thereby obtaining an emulsion (1).

Styrene: 500 parts
n-Butyl acrylate: 500 parts
Tetraethylene glycol diacrylate: 15.0 parts The above materials are added to a mixing vessel equipped with a stirrer and stirred. A mixed solution of 15 parts of an anionic surfactant (DOWFAX 2a1 manufactured by The Dow Chemical Company) and 2,000 parts of deionized water is added to a mixing vessel and stirred, thereby obtaining an emulsion (2).

An anionic surfactant (2.0 parts, DOWFAX manufactured by The Dow Chemical Company) and 90 parts of deionized water are added to a reactor equipped with a stirrer and a nitrogen introduction tube and stirred. The emulsion (1) (100 parts) is added thereto, and 10 parts of an aqueous ammonium persulfate solution having a concentration of 10% is further added thereto. The reactor is cleaned out by nitrogen purging, the reaction solution is heated in an oil bath while being stirred such that the temperature of the reaction solution reaches 60° C. The reaction solution is stirred for 2 hours while being kept at the same temperature, thereby performing emulsion polymerization. Then, the reaction solution is kept as it is for 1 hour, and 1 part of ammonium persulfate is added thereto. The emulsion (2) (1,000 parts) is added to the reactor, the reaction solution is heated in an oil bath while being stirred such that the temperature of the reaction solution reaches 75° C. At this time, at a point in time when half of the emulsion (2) is added, 5.0 parts of tetraethylene glycol diacrylate is added to the emulsion (2), and the obtained mixture is added to the reaction vessel. Subsequently, the temperature of the reaction solution is raised to 90° C., and in a state where the temperature of the reaction solution is being maintained, the reaction solution is stirred for 3 hours. Next, the reaction solution is cooled to room temperature, thereby obtaining a crosslinked resin particle dispersion (1) having a solid content of 35%. The volume-average particle size of resin particles in the crosslinked resin particle dispersion (1) is 180 nm.

Preparation of Colorant Particle Dispersion

C. I. Pigment Blue 15: 3 (Dainichiseika Color & Chemicals Mfg. Co., Ltd.): 70 parts Anionic surfactant (NEOGEN RK, DKS Co. Ltd.): 5 parts
Deionized water: 200 parts The above materials are mixed together and dispersed for 10 minutes by using a homogenizer (ULTRA-TURRAX T50 manufactured by IKA). Deionized water is added to the dispersion, thereby obtaining a colorant particle dispersion (1) having a solid content of 20%. The volume-average particle size of colorant particles in the colorant particle dispersion (1) is 170 nm.

Preparation of Release Agent Particle Dispersion

Paraffin wax (HNP-9, NIPPON SEIRO CO., LTD.): 50 parts
Anionic surfactant (NEOGEN RK, DKS Co. Ltd.): 1 part
Deionized water: 150 parts The above materials are mixed together, heated to 95° C., and dispersed using a homogenizer (ULTRA-TURRAX T50 manufactured by IKA). Furthermore, a dispersion treatment is performed using a Manton Gaulin high-pressure homogenizer (manufactured by Gaulin Corporation), thereby obtaining a release agent particle dispersion (1) having a solid content of 30%. The volume-average particle size of release agent particles in the release agent particle dispersion (1) is 180 nm.

Manufacturing (1) of Toner Particles

Amorphous polyester resin particle dispersion (1) (solid content 30%): 600 parts
Crosslinked resin particle dispersion (1) (solid content 35%): 87 parts
Colorant particle dispersion (1) (solid content 20%): 100 parts
Release agent particle dispersion (1) (solid content 30%): 55 parts
Anionic surfactant (NEOGEN RK, DKS Co. Ltd.): 30 parts
Deionized water: 400 parts The above materials are put in a reactor equipped with a thermometer, a pH meter, and a stirrer, heated to a temperature of 30° C. from the outside with a heating mantle, and kept as it is for 30 minutes while being stirred at a rotation speed of 150 rpm. Thereafter, a 0.3N aqueous nitric acid solution is added thereto such that the pH is adjusted to 3.0, and then a 3% aqueous polyaluminum chloride solution is added thereto in a state where the reaction solution is being dispersed with a homogenizer (ULTRA-TURRAX T50 manufactured by IKA). Then, in a state where the reaction solution is being stirred, the temperature thereof is raised to 50° C. at 0.2° C./min and kept for 30 minutes. Next, 70 parts of the amorphous polyester resin particle dispersion (1) (solid content 30%) having a pH adjusted to 4.0 is added thereto and kept as it is for 1 hour. Subsequently, a 0.1N aqueous sodium hydroxide solution is added thereto such that the pH is adjusted to 8.5, and the reaction solution is kept as it is for 15 minutes, then heated to 85° C. at 1° C./min while being continuously stirred, and kept as it is at 85° C. for 5 hours. Thereafter, cooling, solid-liquid separation, washing and drying of the solids are sequentially carried out, thereby obtaining toner particles having a volume-average particle size of 4.8 μm.

Manufacturing of Toner and Developer

The toner particles (100 parts) and 0.7 parts of silica particles treated with silicone oil (RY200 manufactured by Nippon Aerosil Co., Ltd.) are mixed together by a Henschel mixer, thereby obtaining a toner. The toner (8 parts) and 100 parts of the following carrier are mixed together, thereby obtaining a developer.

Ferrite particles (average particle size 50 μm): 100 parts
Toluene: 14 parts
Styrene-methyl methacrylate copolymer (copolymerization ratio 15/85): 3 parts
Carbon black: 0.2 parts The above components excluding the ferrite particles are dispersed with a sand mill, thereby preparing a dispersion. The dispersion is put in a vacuum deaeration-type kneader together with the ferrite particles, and dried under reduced pressure while being stirred, thereby obtaining a carrier.

Example 2

Toner particles, a toner, and a developer are manufactured in the same manner as in Example 1, except that the crosslinked resin particle dispersion (1) is changed to a crosslinked resin particle dispersion (2). Table 1 shows the composition and preparation conditions of the crosslinked resin particle dispersion (2).

Example 3

Toner particles, a toner, and a developer are manufactured in the same manner as in Example 1, except that the crosslinked resin particle dispersion (1) is changed to a crosslinked resin particle dispersion (3). Table 1 shows the composition and preparation conditions of the crosslinked resin particle dispersion (3).

Example 4

Toner particles, a toner, and a developer are manufactured in the same manner as in Example 1, except that the crosslinked resin particle dispersion (1) is changed to a crosslinked resin particle dispersion (4). Table 1 shows the composition and preparation conditions of the crosslinked resin particle dispersion (4).

Example 5

Toner particles, a toner, and a developer are manufactured in the same manner as in Example 1, except that the crosslinked resin particle dispersion (1) is changed to a crosslinked resin particle dispersion (5). Table 1 shows the composition and preparation conditions of the crosslinked resin particle dispersion (5).

Example 6

A toner, toner particles, and a developer are manufactured in the same manner as in Example 1, except that the amount of the amorphous polyester resin particle dispersion (1) added in Manufacturing (1) of Toner Particles is changed to 540 parts, and the amount of the crystalline polyester resin particle dispersion (1) added is changed to 220 parts.

Example 7

A toner, toner particles, and a developer are manufactured in the same manner as in Example 1, except that the amount of the amorphous polyester resin particle dispersion (1) added in Manufacturing (1) of Toner Particles is changed to 730 parts, and the amount of the crystalline polyester resin particle dispersion (1) added is changed to 30 parts.

Example 8

A toner, toner particles, and a developer are manufactured in the same manner as in Example 1, except that the amount of the amorphous polyester resin particle dispersion (1) added in Manufacturing (1) of Toner Particles is changed to 560 parts, and the amount of the crystalline polyester resin particle dispersion (1) added is changed to 200 parts.

Example 9

A toner, toner particles, and a developer are manufactured in the same manner as in Example 1, except that the amount of the amorphous polyester resin particle dispersion (1) added in Manufacturing (1) of Toner Particles is changed to 690 parts, and the amount of the crystalline polyester resin particle dispersion (1) added is changed to 70 parts.

Example 10

Toner particles, a toner, and a developer are manufactured in the same manner as in Example 1, except that an amorphous polyester resin particle dispersion (2) is prepared by changing the amounts of terephthalic acid and adipic acid added in the preparation of the amorphous polyester resin particle dispersion (1) are changed to 61 parts and 19 parts respectively, and the amorphous polyester resin particle dispersion (1) is changed to the amorphous polyester resin particle dispersion (2).

Example 11

Toner particles, a toner, and a developer are manufactured in the same manner as in Example 1, except that an amorphous polyester resin particle dispersion (3) is prepared by changing the amounts of terephthalic acid and adipic acid added in the preparation of the amorphous polyester resin particle dispersion (1) are changed to 82 parts and 1 part respectively, and the amorphous polyester resin particle dispersion (1) is changed to the amorphous polyester resin particle dispersion (3).

Example 12

Toner particles, a toner, and a developer are manufactured in the same manner as in Example 1, except that an amorphous polyester resin particle dispersion (4) is prepared by changing the amounts of terephthalic acid and adipic acid added in the preparation of the amorphous polyester resin particle dispersion (1) are changed to 65 parts and 16 parts respectively, and the amorphous polyester resin particle dispersion (1) is changed to the amorphous polyester resin particle dispersion (4).

Example 13

Toner particles, a toner, and a developer are manufactured in the same manner as in Example 1, except that the crosslinked resin particle dispersion (1) is changed to a non-crosslinked resin particle dispersion. Table 1 shows the composition and preparation conditions of the non-crosslinked resin particle dispersion.

Example 14

Toner particles, a toner, and a developer are manufactured in the same manner as in Example 1, except that the crosslinked resin particle dispersion (1) is changed to a crosslinked resin particle dispersion (6). Table 1 shows the composition and preparation conditions of the crosslinked resin particle dispersion (6).

Example 15

Toner particles, a toner, and a developer are manufactured in the same manner as in Example 1, except that the crosslinked resin particle dispersion (1) is changed to a crosslinked resin particle dispersion (7). Table 1 shows the composition and preparation conditions of the crosslinked resin particle dispersion (7).

Example 16

Toner particles, a toner, and a developer are manufactured in the same manner as in Example 1, except that the crosslinked resin particle dispersion (1) is changed to a crosslinked resin particle dispersion (8). Table 1 shows the composition and preparation conditions of the crosslinked resin particle dispersion (8).

Example 17

Toner particles, a toner, and a developer are manufactured in the same manner as in Example 1, except that the crosslinked resin particle dispersion (1) is changed to a crosslinked resin particle dispersion (9). Table 1 shows the composition and preparation conditions of the crosslinked resin particle dispersion (9).

Example 18

Vinyl/Amorphous Polyester Composite Resin Particle Dispersion (1)

Amorphous polyester resin particle dispersion (1): 160 parts

Butyl acrylate: 192 parts

10% aqueous ammonia solution: 3.6 parts

The above components and 253 parts of deionized water are put in a 2 L cylindrical stainless steel container, and dispersed and mixed for 10 minutes with a homogenizer (manufactured by IKA, ULTRA-TURRAX T50) at a rotation speed of 10,000 rpm. The raw material dispersion is then moved to a polymerization tank equipped with a stirrer using two paddles as stirring blades and a thermometer, start to be heated with a heating mantle at a rotation speed for stirring of 200 rpm in a nitrogen atmosphere, and kept at 75° C. for 30 minutes. Thereafter, a mixed solution of 1.8 parts of potassium persulfate and 120 parts of deionized water is added dropwise for 120 minutes by a liquid feeding pump, and then kept at 75° C. for 210 minutes. The liquid temperature is lowered to 50° C., 5.4 parts of an anionic surfactant (manufactured by Doufax2A1 manufactured by The Dow Chemical Company) is then added, thereby obtaining a vinyl/amorphous polyester composite resin particle dispersion (1) which is a particle dispersion of a vinyl/amorphous polyester composite resin (1). The vinyl/amorphous polyester composite resin particle dispersion (1) has a volume-average particle size of 205 nm and a concentration of solid content of 35%.

Toner particles, a toner, and a developer are manufactured in the same manner as in Example 1, except that the crosslinked resin particle dispersion (1) is changed to the vinyl/amorphous polyester composite resin particle dispersion (1).

Example 19

Toner particles, a toner, and a developer are manufactured in the same manner as in Example 1, except that the crosslinked resin particle dispersion (1) is changed to a crosslinked resin particle dispersion (10). Table 1 shows the composition and preparation conditions of the crosslinked resin particle dispersion (10).

Example 20

A toner, toner particles, and a developer are manufactured in the same manner as in Example 1, except that the amounts of the amorphous polyester resin particle dispersion (1), the crystalline polyester resin particle dispersion (1), and the crosslinked resin particle dispersion (1) added in Manufacturing (1) of Toner Particles are changed to 430 parts, 110 parts, and 270 parts respectively.

Example 21

A toner, toner particles, and a developer are manufactured in the same manner as in Example 1, except that the amounts of the amorphous polyester resin particle dispersion (1), the crystalline polyester resin particle dispersion (1), and the crosslinked resin particle dispersion (1) added in Manufacturing (1) of Toner Particles are changed to 680 parts, 170 parts, and 4 parts respectively.

Example 22

A toner, toner particles, and a developer are manufactured in the same manner as in Example 1, except that the amounts of the amorphous polyester resin particle dispersion (1), the crystalline polyester resin particle dispersion (1), and the crosslinked resin particle dispersion (1) added in Manufacturing (1) of Toner Particles are changed to 520 parts, 130 parts, and 170 parts respectively.

Example 23

A toner, toner particles, and a developer are manufactured in the same manner as in Example 1, except that the amounts of the amorphous polyester resin particle dispersion (1), the crystalline polyester resin particle dispersion (1), and the crosslinked resin particle dispersion (1) added in Manufacturing (1) of Toner Particles are changed to 650 parts, 160 parts, and 43 parts respectively.

Example 24

Toner particles, a toner, and a developer are manufactured in the same manner as in Example 1, except that Manufacturing (1) of Toner Particles is changed to Manufacturing (2) of Toner Particles.

Manufacturing (2) of Toner Particles

- Amorphous polyester resin particle dispersion (1) (solid content 30%): 480 parts
- Crosslinked resin particle dispersion (1) (solid content 35%): 70 parts
- Colorant particle dispersion (1) (solid content 20%): 100 parts
- Release agent particle dispersion (1) (solid content 30%): 55 parts
- Anionic surfactant (NEOGEN RK, DKS Co. Ltd.): 35 parts
- Deionized water: 400 parts The above materials are put in a reactor equipped with a thermometer, a pH meter, and a stirrer, heated to a temperature of 30° C. from the outside with a heating mantle, and kept as it is for 30 minutes while being stirred at a rotation speed of 150 rpm. Thereafter, a 0.3N aqueous nitric acid solution is added thereto such that the pH is adjusted to 3.0, and then a 3% aqueous polyaluminum chloride solution is added thereto in a state where the reaction solution is being dispersed with a homogenizer (ULTRA-TURRAX T50 manufactured by IKA). Then, in a state where the reaction solution is being stirred, the temperature thereof is raised to 50° C. at 0.2° C./min and kept for 30 minutes. Next, 70 parts of the amorphous polyester resin particle dispersion (1) (solid content 30%) having a pH adjusted to 4.0 is added thereto and kept as it is for 1 hour. Thereafter, 120 parts of the amorphous polyester resin particle dispersion (1) and 17 parts of the crosslinked resin particle dispersion (1) are further added, and the mixture is kept as it is for 30 minutes. The subsequent operations are the same as in Manufacturing (1) of Toner Particles, thereby obtaining toner particles having a volume-average particle size of 4.8 μm.

Example 25

Toner particles, a toner, and a developer are manufactured in the same manner as in Example 1, except that Manufacturing (1) of Toner Particles is changed to Manufacturing (3) of Toner Particles.

Manufacturing (3) of Toner Particles

- Amorphous polyester resin particle dispersion (1) (solid content 30%): 420 parts
- Crystalline polyester resin particle dispersion (1) (solid content 30%): 150 parts
- Crosslinked resin particle dispersion (1) (solid content 35%): 87 parts
- Colorant particle dispersion (1) (solid content 20%): 100 parts
- Release agent particle dispersion (1) (solid content 30%): 55 parts
- Anionic surfactant (NEOGEN RK, DKS Co. Ltd.): 25 parts
- Deionized water: 400 parts The above materials are put in a reactor equipped with a thermometer, a pH meter, and a stirrer, heated to a temperature of 30° C. from the outside with a heating mantle, and kept as it is for 30 minutes while being stirred at a rotation speed of 150 rpm. Thereafter, a 0.3N aqueous nitric acid solution is added thereto such that the pH is adjusted to 3.0, and then a 3% aqueous polyaluminum chloride solution is added thereto in a state where the reaction solution is being dispersed with a homogenizer (ULTRA-TURRAX T50 manufactured by IKA). Then, in a state where the reaction solution is being stirred, the temperature thereof is raised to 50° C. at 0.2° C./min and kept for 30 minutes. Next, 70 parts of the amorphous polyester resin particle dispersion (1) (solid content 30%) having a pH adjusted to 4.0 is added thereto and kept as it is for 1 hour. Then, 180 parts of the amorphous polyester resin particle dispersion (1) is further added, and the mixture is kept as it is for 30 minutes. The subsequent operations are the same as in Manufacturing (1) of Toner Particles, thereby obtaining toner particles having a volume-average particle size of 4.8 μm.

Example 26

Toner particles, a toner, and a developer are manufactured in the same manner as in Example 1, except that Manufacturing (1) of Toner Particles is changed to Manufacturing (2) of Toner Particles, the amount of the crosslinked resin particle dispersion (1) added in Manufacturing (2) of Toner Particles is changed to 78 parts, and the amount of the crosslinked resin particle dispersion (1) further added is changed to 9 parts.

Example 27

Toner particles, a toner, and a developer are manufactured in the same manner as in Example 1, except that Manufacturing (1) of Toner Particles is changed to Manufacturing (3) of Toner Particles, the amount of the amorphous polyester resin particle dispersion (1) added in Manufacturing (3) of Toner Particles is changed to 480 parts, and the amount of the amorphous polyester resin particle dispersion (1) further added is changed to 120 parts.

Example 28

Toner particles, a toner, and a developer are manufactured in the same manner as in Example 1, except that the crosslinked resin particle dispersion (1) is changed to a crosslinked resin particle dispersion (11). Table 1 shows the composition and preparation conditions of the crosslinked resin particle dispersion (11).

Example 29

Toner particles, a toner, and a developer are manufactured in the same manner as in Example 1, except that the crosslinked resin particle dispersion (1) is changed to a crosslinked resin particle dispersion (12). Table 1 shows the composition and preparation conditions of the crosslinked resin particle dispersion (12).

Example 30

Toner particles, a toner, and a developer are manufactured in the same manner as in Example 1, except that the crosslinked resin particle dispersion (1) is changed to a crosslinked resin particle dispersion (13). Table 1 shows the composition and preparation conditions of the crosslinked resin particle dispersion (13).

Example 31

Toner particles, a toner, and a developer are manufactured in the same manner as in Example 1, except that the crosslinked resin particle dispersion (1) is changed to a crosslinked resin particle dispersion (14). Table 1 shows the composition and preparation conditions of the crosslinked resin particle dispersion (14).

Example 32

A toner, toner particles, and a developer are manufactured in the same manner as in Example 1, except that the amounts of the amorphous polyester resin particle dispersion (1), the crystalline polyester resin particle dispersion (1), and the release agent particle dispersion (1) added in Manufacturing (1) of Toner Particles are changed to 470 parts, 120 parts, and 220 parts respectively.

Example 33

Toner particles, a toner, and a developer are manufactured in the same manner as in Example 1, except that the amount of the release agent particle dispersion (1) added is changed to 0 parts.

Example 34

Toner particles, a toner, and a developer are manufactured in the same manner as in Example 1, except that the amounts of the amorphous polyester resin particle dispersion (1) and the release agent particle dispersion (1) added in Manufacturing (1) of Toner Particles are changed to 480 parts and 40 parts, the amount of the amorphous polyester resin particle dispersion (1) further added is changed to 120 parts, and 15 parts of the release agent particle dispersion (1) is further added.

Example 35

A toner and a developer are manufactured in the same manner as in Example 1, except that the 0.37% aqueous ammonia solution in the preparation of the amorphous polyester resin particle dispersion (1) is changed to a 0.41% aqueous ammonia solution to prepare an amorphous polyester resin particle dispersion (5), the amorphous polyester resin particle dispersion (1) is changed to the amorphous polyester resin particle dispersion (5), the amount of the amorphous polyester resin particle dispersion (5) added in Manufacturing (1) of Toner Particles is set to 420 parts, and the amount of the amorphous polyester resin particle dispersion (5) further added is set to 180 parts.

Example 36

A toner and a developer are manufactured in the same manner as in Example 1, except that in Manufacturing (1) of Toner Particles, the amount of the release agent particle dispersion (1) is changed to 50 parts, and 5 parts of the release agent particle dispersion (1) is further added.

Example 37

Toner particles, a toner, and a developer are manufactured in the same manner as in Example 1, except that the silica particles treated with silicone oil are changed to strontium titanate particles.

Example 38

Toner particles, a toner, and a developer are manufactured in the same manner as in Example 1, except that the silica particles treated with silicone oil are changed to the following silica particles (1).

Manufacturing of Silica Particles (1)

Alkali Catalyst Solution-Preparing Step

Methanol (600 g) and 90 g of 10% aqueous ammonia are put in a glass reaction vessel having a volume of 2 L equipped with a stirring blade, a dripping nozzle, and a thermometer, and stirred and mixed together, thereby obtaining an alkali catalyst solution. In the alkali catalyst solution, ammonia catalyst amount: $NH_3$ amount ($NH_3$ [mol]/($NH_3$+methanol+water) [L]) is 0.62 mol/L.

Silica Particle-Generating Step

The temperature of the alkali catalyst solution is adjusted to 48° C., and the alkali catalyst solution is subjected to nitrogen purging. Then, in a state where the alkali catalyst solution is being stirred at 120 rpm, 540 g of tetramethoxysilane (TMOS) and 250 g of aqueous ammonia having a catalyst ($NH_3$) concentration of 4.44% start to be simultaneously added dropwise thereto in the following supply amounts, and the dropwise addition is performed for 20 minutes, thereby obtaining a silica particle suspension. The supply amount of tetramethoxysilane (TMOS) is set to 9 g/min, that is, 0.0032 mol/(mol·min) with respect to the total number of moles of methanol in the alkali catalyst solution. The supply amount of 4.44% aqueous ammonia water is set to 5.0 g/min with respect to the total supply amount of tetraalkoxysilane supplied per minute, which is equivalent to 0.184 mol/min with respect to 1 mol of the total supply amount of tetraalkoxysilane supplied per minute.

By thermal distillation, 250 g of the solvent of the obtained silica particle suspension is distilled off, 250 g of pure water is added, and the solution is dried by a freeze-dryer, thereby obtaining hydrophilic silica particles (1) having different shapes.

Hydrophobic Treatment for Silica Particles

Trimethylsilane (20 g) is added to 100 g of the hydrophilic silica particles (1), and the mixture is reacted at 150° C. for 2 hours, thereby obtaining silica particles (1) that are hydrophilic silica particles having different shapes having undergone a hydrophobic treatment performed on the silica surface.

Physical Properties of Silica Particles (1)

For 100 silica particles (1), an SEM image is captured. As a result of performing image analysis on the SEM image, the average particle size (D50v) of the silica particles (1) is found to be 510 nm.

Example 39

Toner particles, a toner, and a developer are manufactured in the same manner as in Example 1, except that the silica particles treated with silicone oil are changed to the following silica particles (2).

Manufacturing of Silica Particles (2)

Alkali Catalyst Solution-Preparing Step

Methanol (600 g) and 90 g of 10% aqueous ammonia are put in a glass reaction vessel having a volume of 2 L equipped with a stirring blade, a dripping nozzle, and a thermometer, and stirred and mixed together, thereby obtaining an alkali catalyst solution. In the alkali catalyst solution, ammonia catalyst amount: $NH_3$ amount ($NH_3$ [mol]/($NH_3$+methanol+water) [L]) is 0.62 mol/L.

Silica Particle-Generating Step

The temperature of the alkali catalyst solution is adjusted to 20° C., and the alkali catalyst solution is subjected to nitrogen purging. Then, in a state where the alkali catalyst solution is being stirred at 120 rpm, 150 g of tetramethoxysilane (TMOS) and 60 g of aqueous ammonia having a catalyst ($NH_3$) concentration of 4.44% start to be simultaneously added dropwise thereto in the following supply amounts, and the dropwise addition is performed for 20 minutes, thereby obtaining a silica particle suspension. The supply amount of tetramethoxysilane (TMOS) is set to 15 g/min, that is, 0.0053 mol/(mol min) with respect to the total number of moles of methanol in the alkali catalyst solution. The supply amount of 4.44% aqueous ammonia water is set to 6.0 g/min with respect to the total supply amount of tetraalkoxysilane supplied per minute, which is equivalent to 0.143 mol/min with respect to 1 mol of the total supply amount of tetraalkoxysilane supplied per minute.

By thermal distillation, 250 g of the solvent of the obtained silica particle suspension is distilled off, 250 g of pure water is added, and the solution is dried by a freeze-dryer, thereby obtaining hydrophilic silica particles (2) having different shapes.

Hydrophobic Treatment for Silica Particles

Trimethylsilane (20 g) is added to 100 g of the hydrophilic silica particles (2), and the mixture is reacted at 150° C. for 2 hours, thereby obtaining silica particles (2) that are hydrophilic silica particles having different shapes having undergone a hydrophobic treatment performed on the silica surface.

Physical Properties of Silica Particles (2)

For 100 silica particles (2), an SEM image is captured. As a result of performing image analysis on the SEM image, the average particle size (D50v) of the silica particles (2) is found to be 40 nm.

Example 40

Toner particles, a toner, and a developer are manufactured in the same manner as in Example 1, except that the amount of the silica particles treated with silicone oil in manufacturing a toner and a developer is changed to 21 parts.

Example 41

Toner particles, a toner, and a developer are manufactured in the same manner as in Example 1, except that the amount of the silica particles treated with silicone oil in manufacturing a toner and a developer is changed to 0.2 parts.

Example 42

Toner particles, a toner, and a developer are manufactured in the same manner as in Example 1, except that the amount of the silica particles treated with silicone oil in manufacturing a toner and a developer is changed to 8 parts.

Comparative Example 1

Toner particles, a toner, and a developer are manufactured in the same manner as in Example 1, except that the crosslinked resin particle dispersion (1) is changed to a crosslinked resin particle dispersion (15). Table 1 shows the composition and preparation conditions of the crosslinked resin particle dispersion (15).

Comparative Example 2

Toner particles, a toner, and a developer are manufactured in the same manner as in Example 1, except that the crosslinked resin particle dispersion (1) is changed to a crosslinked resin particle dispersion (16). Table 1 shows the composition and preparation conditions of the crosslinked resin particle dispersion (16).

Comparative Example 3

A toner and a developer are manufactured in the same manner as in Example 1, except that the amount of the amorphous polyester resin particle dispersion (1) added in Manufacturing (1) of Toner Particles is changed to 740 parts, and the amount of the crystalline polyester resin particle dispersion (1) added is changed to 15 parts.

Comparative Example 4

A toner and a developer are manufactured in the same manner as in Example 1, except that the crosslinked resin particle dispersion (1) is changed to a crosslinked resin particle dispersion (17), the amount of the amorphous polyester resin particle dispersion (1) added in Manufacturing (1) of Toner Particles is changed to 740 parts, and the amount of the crystalline polyester resin particle dispersion (1) added is changed to 15 parts. Table 1 shows the composition and preparation conditions of the crosslinked resin particle dispersion (17).

Performance Evaluation

The developing device of modified DocuCenter-IV C3370 is filled with the developer of each of examples or comparative examples. The process speed of the image forming apparatus is set to 180 mm/sec, and 20 texts of "KYOU" in 5-point fonts and 20 texts of "KYOU" in 3-point fonts are printed on postcard-sized embossed paper as solid cyan images. An art material (stamping leaf, postcard size gold, Yoshida Kinshiten), from which a foil is to be transferred, is placed on the postcard surface on which the texts are printed, and an iron heated to 150° C. is applied to and slide on the entire surface from above. This operation is repeated twice. The art material is slowly peeled off, and the gold texts "KYOU" are visually observed and classified as follows. The results are shown in Tables 2-3 and 2-4.

1: All the 5-point font texts and all the 3-point font texts are clear.
2: Although all the 5-point font texts are clear, some of the 3-point font texts are difficult to read.
3: Some of the 5-point font texts and some of the 3-point font texts are difficult to read.
4: Most of the 5-point font texts and most of the 3-point font texts are difficult to read.

TABLE 1

| | | Emulsion (1) | | | | | |
|---|---|---|---|---|---|---|---|
| | Crosslinked resin particle dispersion | Styrene | n-Butyl acrylate | Type of crosslinking agent | Crosslinking agent | Anionic surfactant | Polymerization temperature |
| Example 1 | 1 | 50 parts | 50 parts | Tetraethylene glycol diacrylate | 2 parts | 1.5 parts | 60° C. |
| Example 2 | 2 | 56 parts | 44 parts | Tetraethylene glycol diacrylate | 2 parts | 1.5 parts | 60° C. |
| Example 3 | 3 | 40 parts | 60 parts | Tetraethylene glycol diacrylate | 2 parts | 1.5 parts | 60° C. |
| Example 4 | 4 | 57 parts | 43 parts | Tetraethylene glycol diacrylate | 2 parts | 1.5 parts | 60° C. |
| Example 5 | 5 | 45 parts | 55 parts | Tetraethylene glycol diacrylate | 2 parts | 1.5 parts | 60° C. |
| Example 14 | 6 | 50 parts | 50 parts | 1,3-Propanediol diacrylate | 2 parts | 1.5 parts | 60° C. |
| Example 15 | 7 | 50 parts | 50 parts | 1,10-Decanediol diacrylate | 2 parts | 1.5 parts | 60° C. |
| Example 16 | 8 | 50 parts | 50 parts | Ethylene glycol dimethacrylate | 2 parts | 1.5 parts | 60° C. |
| Example 17 | 9 | 50 parts | 50 parts | Polypropylene glycol diacrylate | 2 parts | 1.5 parts | 60° C. |
| Example 19 | 10 | 55 parts | 45 parts | 1,12-Dodecanediol diacrylate | 0.5 parts | 1.5 parts | 60° C. |
| Example 28 | 11 | 50 parts | 50 parts | Tetraethylene glycol diacrylate | 2 parts | 0.5 parts | 60° C. |
| Example 29 | 12 | 50 parts | 50 parts | Tetraethylene glycol diacrylate | 2 parts | 3 parts | 60° C. |
| Example 30 | 13 | 50 parts | 50 parts | Tetraethylene glycol diacrylate | 2 parts | 2.0 parts | 60° C. |
| Example 31 | 14 | 50 | 50 | Tetraethylene | 2 | 1.0 | 60° C. |

TABLE 1-continued

| | | | | | | | |
|---|---|---|---|---|---|---|---|
| | | parts | parts | glycol diacrylate | parts | part | |
| Comparative Example 1 | 15 | 70 parts | 30 parts | Tetraethylene glycol diacrylate | 2 parts | 1.5 parts | 60° C. |
| Comparative Example 2 | 16 | 40 parts | 60 parts | Tetraethylene glycol diacrylate | 0.5 parts | 1.5 parts | 60° C. |
| Comparative Example 4 | 17 | 25 parts | 75 parts | Polypropylene glycol diacrylate | 2 parts | 1.5 parts | 60° C. |
| Example 13 | Non-crosslinked resin particle dispersion | 50 parts | 50 parts | — | — | 1.5 parts | 75° C. |
| | Emulsion (2) | | | | | | |
| | Styrene | n-Butyl acrylate | Type of crosslinking agent | Crosslinking agent First addition | Crosslinking agent Second addition | Anionic surfactant | Polymerization temperature |
| Example 1 | 500 parts | 500 parts | Tetraethylene glycol diacrylate | 15 parts | 5 parts | 15 parts | 75° C. |
| Example 2 | 560 parts | 440 parts | Tetraethylene glycol diacrylate | 15 parts | 5 parts | 15 parts | 75° C. |
| Example 3 | 400 parts | 600 parts | Tetraethylene glycol diacrylate | 15 parts | 5 parts | 15 parts | 75° C. |
| Example 4 | 570 parts | 430 parts | Tetraethylene glycol diacrylate | 15 parts | 5 parts | 15 parts | 75° C. |
| Example 5 | 450 parts | 550 parts | Tetraethylene glycol diacrylate | 15 parts | 5 parts | 15 parts | 75° C. |
| Example 14 | 500 parts | 500 parts | 1,3-Propanediol diacrylate | 15 parts | 5 parts | 15 parts | 75° C. |
| Example 15 | 500 parts | 500 parts | 1,10-Decanediol diacrylate | 15 parts | 5 parts | 15 parts | 75° C. |
| Example 16 | 500 parts | 500 parts | Ethylene glycol dimethacrylate | 15 parts | 5 parts | 15 parts | 75° C. |
| Example 17 | 500 parts | 500 parts | Polypropylene glycol diacrylate | 15 parts | 5 parts | 15 parts | 75° C. |
| Example 19 | 550 parts | 450 parts | 1,12-Dodecanediol diacrylate | 10 parts | — | 15 parts | 75° C. |
| Example 28 | 500 parts | 500 parts | Tetraethylene glycol diacrylate | 15 parts | 5 parts | 10 parts | 75° C. |
| Example 29 | 500 parts | 500 parts | Tetraethylene glycol diacrylate | 15 parts | 5 parts | 17 parts | 75° C. |
| Example 30 | 500 parts | 500 parts | Tetraethylene glycol diacrylate | 15 parts | 5 parts | 15 parts | 75° C. |
| Example 31 | 500 parts | 500 parts | Tetraethylene glycol diacrylate | 15 parts | 5 parts | 15 parts | 75° C. |
| Comparative Example 1 | 700 parts | 300 parts | Tetraethylene glycol diacrylate | 15 parts | 5 parts | 15 parts | 75° C. |
| Comparative Example 2 | 400 parts | 600 parts | Tetraethylene glycol diacrylate | 5 parts | — | 15 parts | 75° C. |
| Comparative Example 4 | 25 parts | 75 parts | Polypropylene glycol diacrylate | 15 parts | 5 parts | 15 parts | 75° C. |
| Example 13 | 500 parts | 500 parts | — | — | — | 15 parts | 75° C. |

*Non-crosslinked resin particle dispersion: The amount of 10% aqueous ammonium persulfate solution used for preparing the resin particle dispersion was changed to 15 parts from 10 parts.

TABLE 2

| | Mass ratio of crystalline polyester resin to total of amorphous polyester resin and crystalline polyester resin % by mass | Mass ratio of aliphatic dicarboxylic acid unit to all dicarboxylic acid unit of entire amorphous polyester resin % by mass | Crosslinked styrene (meth)acrylic resin particles | | | | |
|---|---|---|---|---|---|---|---|
| | | | Ratio to toner particles % by mass | Type of crosslinking agent — | Storage modulus G' at temperature 100° C. higher than temperature T0 Pa | Area ratio of crosslinked resin particles in surface layer portion % | Average particle size nm |
| Comparative Example 1 | 20 | 5 | 10 | Tetraethylene glycol diacrylate | 3.0 × 10^5 | 8 | 200 |
| Comparative Example 2 | 20 | 5 | 10 | Tetraethylene glycol diacrylate | 2.7 × 10^5 | 8 | 200 |
| Comparative Example 3 | 2 | 5 | 10 | Tetraethylene glycol diacrylate | 3.0 × 10^5 | 8 | 200 |
| Comparative Example 4 | 2 | 5 | 10 | Polypropylene glycol diacrylate | 2.6 × 10^5 | 8 | 200 |
| Example 1 | 20 | 5 | 10 | Tetraethylene glycol diacrylate | 3.0 × 10^5 | 8 | 200 |
| Example 2 | 18 | 5 | 10 | Tetraethylene glycol diacrylate | 3.0 × 10^5 | 8 | 200 |
| Example 3 | 30 | 5 | 10 | Tetraethylene glycol diacrylate | 3.0 × 10^5 | 8 | 200 |
| Example 4 | 18 | 5 | 10 | Tetraethylene glycol diacrylate | 3.0 × 10^5 | 8 | 200 |
| Example 5 | 25 | 5 | 10 | Tetraethylene glycol diacrylate | 3.0 × 10^5 | 8 | 200 |
| Example 6 | 41 | 5 | 10 | Tetraethylene glycol diacrylate | 3.0 × 10^5 | 8 | 200 |
| Example 7 | 4 | 5 | 10 | Tetraethylene glycol diacrylate | 3.0 × 10^5 | 8 | 200 |
| Example 8 | 35 | 5 | 10 | Tetraethylene glycol diacrylate | 3.0 × 10^5 | 8 | 200 |
| Example 9 | 10 | 5 | 10 | Tetraethylene glycol diacrylate | 3.0 × 10^5 | 8 | 200 |
| Example 10 | 20 | 31 | 10 | Tetraethylene glycol diacrylate | 3.0 × 10^5 | 8 | 200 |
| Example 11 | 20 | 0.6 | 10 | Tetraethylene glycol diacrylate | 3.0 × 10^5 | 8 | 200 |
| Example 12 | 20 | 25 | 10 | Tetraethylene glycol diacrylate | 3.0 × 10^5 | 8 | 200 |
| Example 13 | 20 | 5 | 10 | N/A | (1.5 × 10^4) | — | 200 |
| Example 14 | 20 | 5 | 10 | 1,3-Propanediol diacrylate | 3.4 × 10^5 | 8 | 200 |
| Example 15 | 20 | 5 | 10 | 1,10-Decanediol diacrylate | 2.9 × 10^5 | 8 | 200 |
| Example 16 | 20 | 5 | 10 | Ethylene glycol dimethacrylate | 3.3 × 10^5 | 8 | 200 |
| Example 17 | 20 | 5 | 10 | Polypropylene glycol diacrylate | 2.5 × 10^5 | 8 | 200 |
| Example 18 | 20 | 5 | 10 | — | 2.8 × 10^5 | 8 | 205 |
| Example 19 | 20 | 5 | 10 | 1,12-Dodecanediol diacrylate | 3.0 × 10^3 | 8 | 200 |
| Example 20 | 20 | 5 | 31 | Tetraethylene glycol diacrylate | 3.0 × 10^5 | 11 | 200 |
| Example 21 | 20 | 5 | 0.6 | Tetraethylene glycol diacrylate | 3.0 × 10^5 | 7 | 200 |
| Example 22 | 20 | 5 | 20 | Tetraethylene glycol diacrylate | 3.0 × 10^5 | 10 | 200 |
| Example 23 | 20 | 5 | 5 | Tetraethylene glycol diacrylate | 3.0 × 10^5 | 7 | 200 |
| Example 24 | 20 | 5 | 10 | Tetraethylene glycol diacrylate | 3.0 × 10^5 | 21 | 200 |
| Example 25 | 20 | 5 | 10 | Tetraethylene glycol diacrylate | 3.0 × 10^5 | 2 | 200 |
| Example 26 | 20 | 5 | 10 | Tetraethylene glycol diacrylate | 3.0 × 10^5 | 17 | 200 |
| Example 27 | 20 | 5 | 10 | Tetraethylene glycol diacrylate | 3.0 × 10^5 | 5 | 200 |
| Example 28 | 20 | 5 | 10 | Tetraethylene glycol | 3.0 × 10^5 | 8 | 310 |

TABLE 2-continued

| | | | | | | | |
|---|---|---|---|---|---|---|---|
| | | | | diacrylate | | | |
| Example 29 | 20 | 5 | 10 | Tetraethylene glycol diacrylate | $3.0 \times 10^5$ | 8 | 80 |
| Example 30 | 20 | 5 | 10 | Tetraethylene glycol diacrylate | $3.0 \times 10^5$ | 8 | 250 |
| Example 31 | 20 | 5 | 10 | Tetraethylene glycol diacrylate | $3.0 \times 10^5$ | 8 | 120 |
| Example 32 | 20 | 5 | 2 | Tetraethylene glycol diacrylate | $3.0 \times 10^5$ | 8 | 200 |
| Example 33 | 20 | 5 | 10 | Tetraethylene glycol diacrylate | $3.0 \times 10^5$ | 8 | 200 |
| Example 34 | 20 | 5 | 10 | Tetraethylene glycol diacrylate | $3.0 \times 10^5$ | 8 | 200 |
| Example 35 | 20 | 5 | 10 | Tetraethylene glycol diacrylate | $3.0 \times 10^5$ | 8 | 200 |
| Example 36 | 20 | 5 | 10 | Tetraethylene glycol diacrylate | $3.0 \times 10^5$ | 8 | 200 |
| Example 37 | 20 | 5 | 10 | Tetraethylene glycol diacrylate | $3.0 \times 10^5$ | 8 | 200 |
| Example 38 | 20 | 5 | 10 | Tetraethylene glycol diacrylate | $3.0 \times 10^5$ | 8 | 200 |
| Example 39 | 20 | 5 | 10 | Tetraethylene glycol diacrylate | $3.0 \times 10^5$ | 8 | 200 |
| Example 40 | 20 | 5 | 10 | Tetraethylene glycol diacrylate | $3.0 \times 10^5$ | 8 | 200 |
| Example 41 | 20 | 5 | 10 | Tetraethylene glycol diacrylate | $3.0 \times 10^5$ | 8 | 200 |
| Example 42 | 20 | 5 | 10 | Tetraethylene glycol diacrylate | $3.0 \times 10^5$ | 8 | 200 |

| | | | External additive | | | | Condition (2) | | |
|---|---|---|---|---|---|---|---|---|---|
| | Ww/Wp<br>— | Area ratio of release agent in surface layer portion<br>% | Type<br>— | Average particle size<br>nm | Amount of external additive added to exterior of toner particle with respect to 100 parts of toner particles<br>Parts by mass | Condition (1) Temperature T0<br>° C. | Complex viscosity η* at temperature T0<br>Pa · s | ΔA<br>— | Trasnfer of foil<br>— |
| Comparative Example 1 | 0.6 | 5 | Silica | 100 | 0.7 | 40 | $1.0 \times 10^8$ | 0.1 | 4 |
| Comparative Example 2 | 0.6 | 5 | Silica | 100 | 0.7 | 40 | $0.9 \times 10^4$ | 0.6 | 4 |
| Comparative Example 3 | 0.6 | 5 | Silica | 100 | 0.7 | 51 | $2.0 \times 10^5$ | 0.6 | 4 |
| Comparative Example 4 | 0.6 | 5 | Silica | 100 | 0.7 | 51 | $0.9 \times 10^4$ | 0.1 | 4 |
| Example 1 | 0.6 | 5 | Silica | 100 | 0.7 | 40 | $2.0 \times 10^5$ | 0.6 | 1 |
| Example 2 | 0.6 | 5 | Silica | 100 | 0.7 | 49 | $1.0 \times 10^5$ | 0.4 | 3 |
| Example 3 | 0.6 | 5 | Silica | 100 | 0.7 | 10 | $1.0 \times 10^7$ | 0.5 | 2 |
| Example 4 | 0.6 | 5 | Silica | 100 | 0.7 | 47 | $1.0 \times 10^5$ | 0.4 | 3 |
| Example 5 | 0.6 | 5 | Silica | 100 | 0.7 | 30 | $1.0 \times 10^6$ | 0.6 | 1 |
| Example 6 | 0.6 | 5 | Silica | 100 | 0.7 | 36 | $3.0 \times 10^5$ | 0.3 | 3 |
| Example 7 | 0.6 | 5 | Silica | 100 | 0.7 | 43 | $1.0 \times 10^5$ | 0.5 | 3 |
| Example 8 | 0.6 | 5 | Silica | 100 | 0.7 | 39 | $2.1 \times 10^5$ | 0.5 | 2 |
| Example 9 | 0.6 | 5 | Silica | 100 | 0.7 | 41 | $2.0 \times 10^5$ | 0.5 | 2 |
| Example 10 | 0.6 | 5 | Silica | 100 | 0.7 | 40 | $2.0 \times 10^5$ | 0.6 | 3 |
| Example 11 | 0.6 | 5 | Silica | 100 | 0.7 | 40 | $2.0 \times 10^5$ | 0.6 | 3 |
| Example 12 | 0.6 | 5 | Silica | 100 | 0.7 | 40 | $2.0 \times 10^5$ | 0.6 | 2 |
| Example 13 | 0.6 | 5 | Silica | 100 | 0.7 | 40 | $1.9 \times 10^4$ | 0.7 | 3 |
| Example 14 | 0.6 | 5 | Silica | 100 | 0.7 | 40 | $1.8 \times 10^5$ | 0.5 | 2 |
| Example 15 | 0.6 | 5 | Silica | 100 | 0.7 | 40 | $2.1 \times 10^5$ | 0.6 | 1 |
| Example 16 | 0.6 | 5 | Silica | 100 | 0.7 | 40 | $1.9 \times 10^5$ | 0.6 | 3 |
| Example 17 | 0.6 | 5 | Silica | 100 | 0.7 | 40 | $2.2 \times 10^5$ | 0.6 | 1 |
| Example 18 | 0.6 | 5 | Silica | 100 | 0.7 | 40 | $1.9 \times 10^5$ | 0.6 | 3 |
| Example 19 | 0.6 | 5 | Silica | 100 | 0.7 | 40 | $2.5 \times 10^5$ | 0.6 | 3 |

TABLE 2-continued

| | | | | | | | | | |
|---|---|---|---|---|---|---|---|---|---|
| Example 20 | 0.34 | 5 | Silica | 100 | 0.7 | 44 | 1.0 × 10^5 | 0.3 | 3 |
| Example 21 | 9.2 | 5 | Silica | 100 | 0.7 | 38 | 2.5 × 10^5 | 0.6 | 3 |
| Example 22 | 0.3 | 5 | Silica | 100 | 0.7 | 43 | 1.2 × 10^5 | 0.4 | 2 |
| Example 23 | 1.1 | 5 | Silica | 100 | 0.7 | 39 | 2.0 × 10^5 | 0.6 | 2 |
| Example 24 | 0.6 | 5 | Silica | 100 | 0.7 | 40 | 2.0 × 10^5 | 0.6 | 3 |
| Example 25 | 0.6 | 5 | Silica | 100 | 0.7 | 40 | 2.0 × 10^5 | 0.6 | 3 |
| Example 26 | 0.6 | 5 | Silica | 100 | 0.7 | 40 | 2.0 × 10^5 | 0.6 | 2 |
| Example 27 | 0.6 | 5 | Silica | 100 | 0.7 | 40 | 2.0 × 10^5 | 0.6 | 2 |
| Example 28 | 0.6 | 5 | Silica | 100 | 0.7 | 40 | 2.0 × 10^5 | 0.6 | 3 |
| Example 29 | 0.6 | 5 | Silica | 100 | 0.7 | 40 | 2.0 × 10^5 | 0.6 | 3 |
| Example 30 | 0.6 | 5 | Silica | 100 | 0.7 | 40 | 2.0 × 10^5 | 0.6 | 2 |
| Example 31 | 0.6 | 5 | Silica | 100 | 0.7 | 40 | 2.0 × 10^5 | 0.6 | 2 |
| Example 32 | 11 | 5 | Silica | 100 | 0.7 | 38 | 2.5 × 10^5 | 0.6 | 3 |
| Example 33 | — | — | Silica | 100 | 0.7 | 40 | 2.0 × 10^5 | 0.6 | 3 |
| Example 34 | 0.6 | 21 | Silica | 100 | 0.7 | 40 | 2.0 × 10^5 | 0.6 | 3 |
| Example 35 | 0.6 | 0.5 | Silica | 100 | 0.7 | 40 | 2.0 × 10^5 | 0.6 | 3 |
| Example 36 | 0.6 | 10 | Silica | 100 | 0.7 | 40 | 2.0 × 10^5 | 0.6 | 2 |
| Example 37 | 0.6 | 5 | Strontium titanate | 100 | 0.7 | 40 | 2.0 × 10^5 | 0.6 | 1 |
| Example 38 | 0.6 | 5 | Silica | 510 | 0.7 | 40 | 2.0 × 10^5 | 0.6 | 3 |
| Example 39 | 0.6 | 5 | Silica | 40 | 0.7 | 40 | 2.0 × 10^5 | 0.6 | 3 |
| Example 40 | 0.6 | 5 | Silica | 100 | 21 | 40 | 2.0 × 10^5 | 0.6 | 3 |
| Example 41 | 0.6 | 5 | Silica | 100 | 0.2 | 40 | 2.0 × 10^5 | 0.6 | 3 |
| Example 42 | 0.6 | 5 | Silica | 100 | 8 | 40 | 2.0 × 10^5 | 0.6 | 2 |

The electrostatic charge image developing toner, the electrostatic charge image developer, the toner cartridge, the process cartridge, the image forming apparatus, and the image forming method of the present disclosure include the following aspects.

(((1)))

An electrostatic charge image developing toner, comprising:

toner particles that contain a binder resin containing an amorphous resin and a crystalline resin and resin particles, wherein the electrostatic charge image developing toner satisfies the following Condition (1) and Condition (2), Condition (1): in a case where dynamic viscoelasticity of the toner particles is measured, a temperature T0 at which a complex viscosity η* of the toner particles is $1.0\times10^7$ Pa·s is 50° C. or lower, Condition (2): in a case where dynamic viscoelasticity of the resin particles is measured, a complex viscosity η* of the resin particles at the temperature T0 is $1.0\times10^4$ Pa·s or more, and ΔA calculated by the following Equation (1) is 0.2 or more, $$\Delta A=|\mathrm{Log}\ \eta^*(T0+5)-\mathrm{Log}\ \eta^*(T0-5)|, \quad \text{Equation (1)}$$

in Equation (1), η*(T0+5) is a complex viscosity (unit: Pa·s) at a temperature 5° C. higher than the temperature T0, and η*(T0−5) is a complex viscosity (unit: Pa·s) at a temperature 5° C. lower than the temperature T0.

(((2)))

The electrostatic charge image developing toner according to (((1))), wherein the amorphous resin includes an amorphous polyester resin, the crystalline resin includes a crystalline polyester resin, and a mass ratio of the crystalline polyester resin to a total of the amorphous polyester resin and the crystalline polyester resin is 5% by mass or more and 40% by mass or less.

(((3)))

The electrostatic charge image developing toner according to (((1))) or (((2))), wherein the amorphous resin includes an amorphous polyester resin, the amorphous polyester resin includes an amorphous polyester resin having an aliphatic dicarboxylic acid unit, and a mass ratio of the aliphatic dicarboxylic acid unit to all dicarboxylic acid units in the entire amorphous polyester resin is 1% by mass or more and 30% by mass or less.

(((4)))

The electrostatic charge image developing toner according to any one of (((1))) to (((3))), wherein the resin particles are crosslinked resin particles.

(((5)))

The electrostatic charge image developing toner according to (((4))), wherein the resin configuring the crosslinked resin particles is a crosslinked vinyl-based resin having a crosslinked structure derived from at least one difunctional (meth)acrylate selected from the group consisting of a compound represented by Formula (A), a compound represented by Formula (B), and a compound represented by the formula (C).

(((6)))

The electrostatic charge image developing toner according to (((4))) or (((5))), wherein the crosslinked resin particles are crosslinked styrene(meth)acrylic resin particles.

(((7)))

The electrostatic charge image developing toner according to any one of (((4))) to (((6))), wherein in a case where dynamic viscoelasticity of the crosslinked resin particles is measured, a storage modulus G' at a temperature 100° C. higher than the temperature T0 is $1.0\times10^4$ Pa or more.

(((8)))

The electrostatic charge image developing toner according to any one of (((4))) to (((7))), wherein a mass ratio of the crosslinked resin particles to the toner particles is 1% by mass or more and 30% by mass or less.

(((9)))

The electrostatic charge image developing toner according to any one of (((4))) to (((8))), wherein in a case where Dt (μm) represents a volume-average particle size of the toner particles, and a region from a surface of the toner particles to a depth (Dt/5) μm is defined as a surface layer portion, a ratio of a total area of the crosslinked resin particles contained in the surface layer portion to a total area of the surface layer portion is 3% or more and 20% or less in observation of cross sections of the toner particles.

(((10)))

The electrostatic charge image developing toner according to any one of (((4))) to (((9))), wherein an average particle size of the crosslinked resin particles is 100 nm or more and 300 nm or less in observation of cross sections of the toner particles.

(((11)))

The electrostatic charge image developing toner according to any one of (((4))) to (((10))), wherein the toner particles further contain a release agent, and a ratio Ww/Wp of a content Ww of the release agent contained in the toner particles to a content Wp of the crosslinked resin particles is 0.03 or more and 10 or less.

(((12)))

The electrostatic charge image developing toner according to any one of (((1))) to (((11)))

wherein in a case where Dt (μm) represents a volume-average particle size of the toner particles, and a region from a surface of the toner particles to a depth (Dt/5) μm is defined as a surface layer portion, a ratio of a total area of the release agent contained in the surface layer portion to a total area of the surface layer portion is 1% or more and 20% or less in observation of cross sections of the toner particles.

(((13)))

The electrostatic charge image developing toner according to any one of (((1))) to (((12))), further comprising:

an external additive added to an exterior of the toner particles, wherein the external additive includes inorganic particles.

(((14)))

The electrostatic charge image developing toner according to any one of (((1))) to (((13))), further comprising:

an external additive added to an exterior of the toner particles, wherein an average particle size of the external additive is 50 nm or more and 500 nm or less.

(((15)))

The electrostatic charge image developing toner according to any one of (((1))) to (((14))), further comprising:

an external additive added to an exterior of the toner particles, wherein a content of the external additive is 0.3 parts by mass or more and 20 parts by mass or less with respect to 100 parts by mass of the toner particles.

(((16)))

An electrostatic charge image developer comprising the electrostatic charge image developing toner according to any one of (((1))) to (((15))).

(((17)))

A toner cartridge comprising:

a container that contains the electrostatic charge image developing toner according to any one of (((1))) to ((15))), wherein the toner cartridge is detachable from an image forming apparatus.

(((18)))

A process cartridge comprising:

a developing unit that contains the electrostatic charge image developer according to (((16))) and develops an electrostatic charge image formed on a surface of an image holder as a toner image by using the electrostatic charge image developer, wherein the process cartridge is detachable from an image forming apparatus.

(((19)))

An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according (((16))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

(((20)))

An image forming method comprising:

charging a surface of an image holder;

forming an electrostatic charge image on the charged surface of the image holder;

developing the electrostatic charge image formed on the surface of the image holder as a toner image by using the electrostatic charge image developer according to (((16)));

transferring the toner image formed on the surface of the image holder to a surface of a recording medium; and fixing the toner image transferred to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles that contain a binder resin containing an amorphous resin and a crystalline resin and resin particles, wherein the resin particles are crosslinked resin particles, wherein the electrostatic charge image developing toner satisfies the following Condition (1) and Condition (2), Condition (1): in a case where dynamic viscoelasticity of the toner particles is measured, a temperature T0 at which a complex viscosity $\eta^*$ of the toner particles is $1.0\times10^7$ Pa·s is 50° C. or lower, Condition (2): in a case where dynamic viscoelasticity of the resin particles is measured, a complex viscosity $n°$ of the resin particles at the temperature T0 is $1.0\times10^4$ Pa·s or more, and ΔA calculated by the following Equation (1) is 0.2 or more, $$\Delta A = |\text{Log}\eta^*(T0+5) - \text{Log}\eta^*(T0-5)|, \quad \text{Equation (1)}$$

in Equation (1), $\eta^*$ (T0+5) is a complex viscosity (unit: Pa·s) at a temperature 5° C. higher than the temperature T0, and $\eta^*$(T0–5) is a complex viscosity (unit: Pa·s) at a temperature 5° C. lower than the temperature T0.

2. The electrostatic charge image developing toner according to claim 1, wherein the amorphous resin includes an amorphous polyester resin, the crystalline resin includes a crystalline polyester resin, and a mass ratio of the crystalline polyester resin to a total of the amorphous polyester resin and the crystalline polyester resin is 5% by mass or more and 40% by mass or less.

3. The electrostatic charge image developing toner according to claim 1, wherein the amorphous resin includes an amorphous polyester resin, the amorphous polyester resin includes an amorphous polyester resin having an aliphatic dicarboxylic acid unit, and a mass ratio of the aliphatic dicarboxylic acid unit to all dicarboxylic acid units in the entire amorphous polyester resin is 1% by mass or more and 30% by mass or less.

4. The electrostatic charge image developing toner according to claim 1, wherein the resin configuring the crosslinked resin particles is a crosslinked vinyl-based resin having a crosslinked structure derived from at least one difunctional (meth)acrylate selected from the group consisting of a compound represented by the following Formula (A), a compound represented by the following Formula (B), and a compound represented by the following Formula (C), Formula (A)

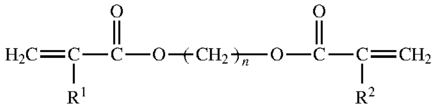

Formula (B)

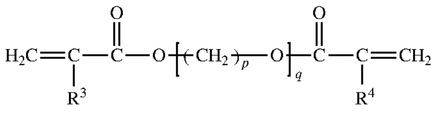

Formula (C)

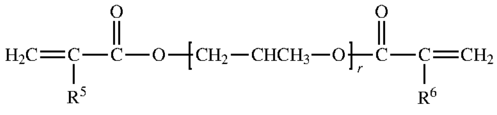

in Formula (A), $R^1$ and $R^2$ each independently represent a hydrogen atom or a methyl group, and n is an integer of 4 or more and 20 or less, in Formula (B), $R^3$ and $R^4$ each independently represent a hydrogen atom or a methyl group, p is an integer of 2 or more and 4 or less, and q is an integer of 3 or more and 20 or less, in Formula (C), $R^5$ and $R^6$ each independently represent a hydrogen atom or a methyl group, and r is an integer of 2 or more and 20 or less.

5. The electrostatic charge image developing toner according to claim 1, wherein the crosslinked resin particles are crosslinked styrene(meth)acrylic resin particles.

6. The electrostatic charge image developing toner according to claim 1, wherein in a case where dynamic viscoelasticity of the crosslinked resin particles is measured, a storage modulus G' at a temperature 100° C. higher than the temperature T0 is $1.0\times10^4$ Pa or more.

7. The electrostatic charge image developing toner according to claim 1, wherein a mass ratio of the crosslinked resin particles to the toner particles is 1% by mass or more and 30% by mass or less.

8. The electrostatic charge image developing toner according to claim 1, wherein in a case where Dt (μm) represents a volume-average particle size of the toner particles, and a region from a surface of the toner particles to a depth (Dt/5) μm is defined as a surface layer portion, a ratio of a total area of the crosslinked resin particles contained in the surface layer portion to a total area of the surface layer portion is 3% or more and 20% or less in observation of cross sections of the toner particles.

9. The electrostatic charge image developing toner according to claim 1, wherein an average particle size of the crosslinked resin particles is 100 nm or more and 300 nm or less in observation of cross sections of the toner particles.

10. The electrostatic charge image developing toner according to claim 1, wherein the toner particles further contain a release agent, and a ratio Ww/Wp of a content Ww of the release agent contained in the toner particles to a content Wp of the crosslinked resin particles is 0.03 or more and 10 or less.

11. The electrostatic charge image developing toner according to claim 1, wherein the toner particles further contain a release agent, and in a case where Dt (μm) represents a volume-average particle size of the toner particles, and a region from a surface of the toner particles to a depth (Dt/5) μm is defined as a surface layer portion, a ratio of a total area of the release agent contained in the surface layer portion to a total area of the surface layer portion is 1% or more and 20% or less in observation of cross sections of the toner particles.

12. The electrostatic charge image developing toner according to claim 1, further comprising:

an external additive added to an exterior of the toner particles, wherein the external additive includes inorganic particles.

13. The electrostatic charge image developing toner according to claim 1, further comprising:

an external additive added to an exterior of the toner particles, wherein an average particle size of the external additive is 50 nm or more and 500 nm or less.

14. The electrostatic charge image developing toner according to claim 1, further comprising:

an external additive added to an exterior of the toner particles, wherein a content of the external additive is 0.3 parts by mass or more and 20 parts by mass or less with respect to 100 parts by mass of the toner particles.

15. An electrostatic charge image developer comprising:

the electrostatic charge image developing toner according to claim 1.

16. A toner cartridge comprising:

a container that contains the electrostatic charge image developing toner according to claim 1, wherein the toner cartridge is detachable from an image forming apparatus.

17. A process cartridge comprising:

a developing unit that contains the electrostatic charge image developer according to claim 15 and develops an electrostatic charge image formed on a surface of an image holder as a toner image by using the electrostatic charge image developer, wherein the process cartridge is detachable from an image forming apparatus.

18. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 15 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

19. An image forming method comprising:

charging a surface of an image holder;

forming an electrostatic charge image on the charged surface of the image holder;

developing the electrostatic charge image formed on the surface of the image holder as a toner image by using the electrostatic charge image developer according to claim 15;

transferring the toner image formed on the surface of the image holder to a surface of a recording medium; and fixing the toner image transferred to the surface of the recording medium.

* * * * *